(12) United States Patent
Madden

(10) Patent No.: US 11,595,389 B1
(45) Date of Patent: *Feb. 28, 2023

(54) SECURE DEPLOYMENT CONFIRMATION OF IOT DEVICES VIA BEARER TOKENS WITH CAVEATS

(71) Applicant: ForgeRock, Inc., San Francisco, CA (US)

(72) Inventor: Neil Edward Madden, Stroud (GB)

(73) Assignee: ForgeRock, Inc., San Francisco, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 17/125,052

(22) Filed: Dec. 17, 2020

(51) Int. Cl.
*H04L 9/40* (2022.01)
*H04L 9/32* (2006.01)
*H04L 9/00* (2022.01)

(52) U.S. Cl.
CPC ........ *H04L 63/0884* (2013.01); *H04L 9/3242* (2013.01); *H04L 63/102* (2013.01); *H04L 63/107* (2013.01); *H04L 9/50* (2022.05)

(58) Field of Classification Search
CPC ....... H04L 9/3213; H04L 9/3242; H04L 9/50; H04L 63/0884; H04L 63/102; H04L 63/107

See application file for complete search history.

(56) References Cited

U.S. PATENT DOCUMENTS

| | | | |
|---|---|---|---|
| 9,397,990 B1 * | 7/2016 | Taly | H04L 63/08 |
| 10,146,932 B2 | 12/2018 | Birgisson et al. | |
| 10,630,501 B2 | 4/2020 | Ansari et al. | |
| 10,686,885 B2 | 6/2020 | Goyal et al. | |
| 10,705,808 B2 | 7/2020 | Chiosi et al. | |
| 10,817,346 B1 | 10/2020 | Culp et al. | |

(Continued)

OTHER PUBLICATIONS

Cichonski et al., "Computer Security Incident Handling Guide", National Institute of Standards and Technology, U.S. Department of Commerce, Special Publication 800-61, Revision 2, http://dx.doi.org/10.6028/NIST.SP.800-61r2, Gaithersburg, MD, 2012, 79 pages.

(Continued)

*Primary Examiner* — Eric W Shepperd
(74) *Attorney, Agent, or Firm* — Haynes Beffel & Wolfeld, LLP; Ernest J. Beffel, Jr.

(57) ABSTRACT

The disclosed technology teaches confirming proper deployment of sensors, with an authorization server (AS) issuing to a first client a Macaroon access token (MAT), optionally with caveats, including a root signature, and providing the MAT to a client. The client modifies the MAT to produce multiple instances by appending caveats that add a deployment location to each of the instances, and applies a message authentication code (MAC) chaining algorithm to generate updated signatures to include in the instances of a MAT with caveats (MATwC). The first client forwards the multiple instances of the MATwC to respective sensor instances, and a second client receives, from the sensor instances, sensed data and location indicative data, accompanied by respective MATwC instances. The second client verifies that the location indicative data is consistent with the deployment location caveat in the respective MATwC and utilizes instances of the sensed data that are verified as consistent.

24 Claims, 13 Drawing Sheets

(56) References Cited

U.S. PATENT DOCUMENTS

| | | | |
|---|---|---|---|
| 10,848,477 | B2 | 11/2020 | Baumgarte et al. |
| 11,347,560 | B2 | 5/2022 | Culp et al. |
| 2005/0154925 | A1* | 7/2005 | Chitrapu ............... H04L 9/3234 726/19 |
| 2015/0205708 | A1 | 7/2015 | Michelsen |
| 2015/0363563 | A1* | 12/2015 | Hallwachs ............. G16H 40/67 705/3 |
| 2017/0214664 | A1 | 7/2017 | Birgisson et al. |
| 2017/0223005 | A1 | 8/2017 | Birgisson et al. |
| 2017/0295062 | A1 | 10/2017 | Tang |
| 2018/0285871 | A1 | 10/2018 | Long |
| 2019/0025873 | A1 | 1/2019 | Goodrich et al. |
| 2019/0028478 | A1* | 1/2019 | Love .................. G07C 9/00571 |
| 2019/0130689 | A1* | 5/2019 | Baumgarte ........ G07C 9/00182 |
| 2019/0253894 | A1 | 8/2019 | Bykampadi et al. |
| 2020/0042012 | A1* | 2/2020 | Zander ................ G01C 21/3841 |
| 2020/0100108 | A1* | 3/2020 | Everson .............. H04W 12/068 |
| 2020/0280517 | A1 | 9/2020 | Kwon et al. |
| 2022/0107846 | A1 | 4/2022 | Culp et al. |

OTHER PUBLICATIONS

"Hardening your cluster's security", Kubernetes Engine, (https://cloud.google.com/kubernetes-engine/docs/concepts/security-overview), Jul. 2019, 10 pages.

Dempsey, et al., "Information Security Continuous Monitoring (ISCM) for Federal Information Systems and Organizations", NIST National Institute of Standards and Technology, U.S. Dept. of Commerce, NIST Special Publication 800-137, 2011, Gaithersburg, MD, 80 pages.

M. Jones at al, RFC 7519, JSON Web Token (JWT), May 2015, 30 pages (downloaded from https://datatracker.ietf.org/doc/html/rfc7519).

U.S. Appl. No. 17/124,830, filed Dec. 17, 2020, Pending.
U.S. Appl. No. 17/124,901, filed Dec. 17, 2020, Pending.
U.S. Appl. No. 17/124,982, filed Dec. 17, 2020, Pending.

T. Lodderstedt at al, Web Authorization Protocol,"OAuth 2.0 Rich Authorization Requests, draft-ietf-oauth-rar-03", Oct. 18, 2020, 35 pages (downloaded from https://datatracker.ietf.org/doc/draft-ietf-oauth-rar/).

Mateo, Leonardo, "Macaroons—a new flavor for authorization", Jun. 7, 2016, TMH Technology Blog, 7 pages, downloaded http://tech.tmh.io/concept/2016/06/07/macaroons-a-new-flavor-for-autho . . . ).

D. Hardt at al, Web Authorization Protocol,"The OAuth 2.1 Authorization Framework draft-ietf-oauth-v2-1-00", Oct. 18, 2020, Jul. 30, 2020, 85 pages (downloaded from https://datatracker.ietf.org/doc/draft-ietf-oauth-v2-1/).

Webber et al., Authorization Capabilities for Linked Data v0.3, Oct. 22, 2020, W3C Community Group, 14 pages (downloaded from https://w3c-ccg.github.io/zcap-ld/).

Webber et al., "Linked Data Capabilities", WebOfTrustInfo / rwot5-boston, Jan. 12, 2018, 15 pages, downloaded from https://github.com/WebOfTrustInfo/rwot5-boston/blob/master/final-documents/lds-ocap.md.

Birgisson et al., "Macaroons: Cookies with Contextual Caveats for Decentralized Authorization in the Cloud" NDSS '14, Feb. 23-26, 2014, 16 pages.

M. Jones at al, RFC 7515, "JSON Web Signature (JWS)", May 2015, 59 pages (downloaded from https://www.rfc-editor.org/info/rfc7515).

M. Jones at al, RFC 7800, "Proof-of-Possession Key Semantics for JSON Web Tokens (JWTs)", Internet Engineering Task Force (IETF), Apr. 2016, 15 pages (downloaded from https://www.rfc-editor.org/info/rfc7800).

B. Campell at al, RFC 8705, "OAuth 2.0 Mutual-TLS Client Authentication and Certificate-Bound Access Tokens", Internet Engineering Task Force (IETF), Feb. 2020, 24 pages (downloaded from https://www.rfc-editor.org/info/rfc8705).

Curio io, "The Phantom Token Approach", 4 pags (accessed Dec. 15, 2020, https://curity.io/resources/architect/api-security/phantom-token-pattern/#the-phantom-token-approach).

Lopez-Alt, Adrian, "Cryptographic Security of Macaroon Authorization Credentials", Dec. 6, 2013, New York University, Tech. Rep. TR2013-962, (downloaded from https://cs.nyu.edu/dynamic/reports/?year=2013).

N. Sakimura et al., "OpenID Connect Core 1.0 incorporating errata set 1, Section 5.5.1. Individual Claims Requests", Nov. 8, 2014, The OpenID Foundation, 2 pages (downloaded from https://openid.net/specs/openid-connect-core-1_0.html#IndividualClaimsRequests).

"Enabling the UK Open Banking Specification, A ForgeRock Technical Solution Guide", ForgeRock, Inc. 2018, 15 pages.

D. Hardt at al, "The Grant Negotiation and Authorization Protocol draft-hardt-xauth-protocol-14", Aug. 15, 2020, 42 pages (downloaded from https://datatracker.ietf.org/doc/draft-hardt-xauth-protocol/).

D. Fett at al, "OAuth 2.0 Demonstration of Proof-of-Possession at the Application Layer draft-fett-oauth-dpop-04", Mar. 4, 2020, 15 pages (downloaded from ttps://datatracker.ietf.org/doc/draft-fett-oauth-dpop/).

Madden, Neil, "Least privilege with less effort: Macaroon access tokens in AM 7.0 Part 1: Lightweight PoP", NeillMadden Blog, Jul. 29, 2020, 9 pages (downloaded from https://neilmadden.blog/2020/07/29/least-privilege-with-less-effort-macaroon-access-tokens-in-am-7-0/).

Madden, Neil, "Macaroon access tokens for OAuth: Part 2—transactional auth", NeillMadden Blog, Sep. 9, 2020, 10 pages (downloaded from https://neilmadden.blog/2020/09/09/macaroon-access-tokens-for-oauth-part-2-transactional-auth/).

"Installation Guide, Identity Edge Controller 6.5.0", ForgeRock, Inc., 2019, 17 pages.

D. Hardt at al, RFC 6749, "The OAuth 2.0 Authorization Framework", Oct. 2012, 76 pages (downloaded from hthttps://www.rfc-editor.org/info/rfc6749/).

"DropBox Chooser", DropBox.com, Aug. 2020, (downloaded from https://www.dropbox.com/developers/chooser).

M. Jones et al., RFC 6750—"The OAuth 2.0 Authorization Framework: Bearer Token Usage", Oct. 2012, 19 pages (https://www.rfc-editor.org/info/rfc6750).

"Quick Start Guide, ForgeRock Access Management 6.5.", part 1 of 2 (pp. 1-1473), ForgeRock, Inc., Mar. 2020, 1473 pages (downloaded from https://backstage.forgerock.com/docs/am/6.5/quick-start-guide/[3/31/2020).

"Quick Start Guide, ForgeRock Access Management 6.5.", part 2 of 2 (pp. 1474-2959), ForgeRock, Inc., Mar. 2020, 1486 pages (downloaded from https://backstage.forgerock.com/docs/am/6.5/quick-start-guide/[3/31/2020).

Soumalainen, Defense-in-Depth methods in Microservices Access Control, Master's Thesis, Tampere University, dated Feb. 2019, 86 pages.

* cited by examiner

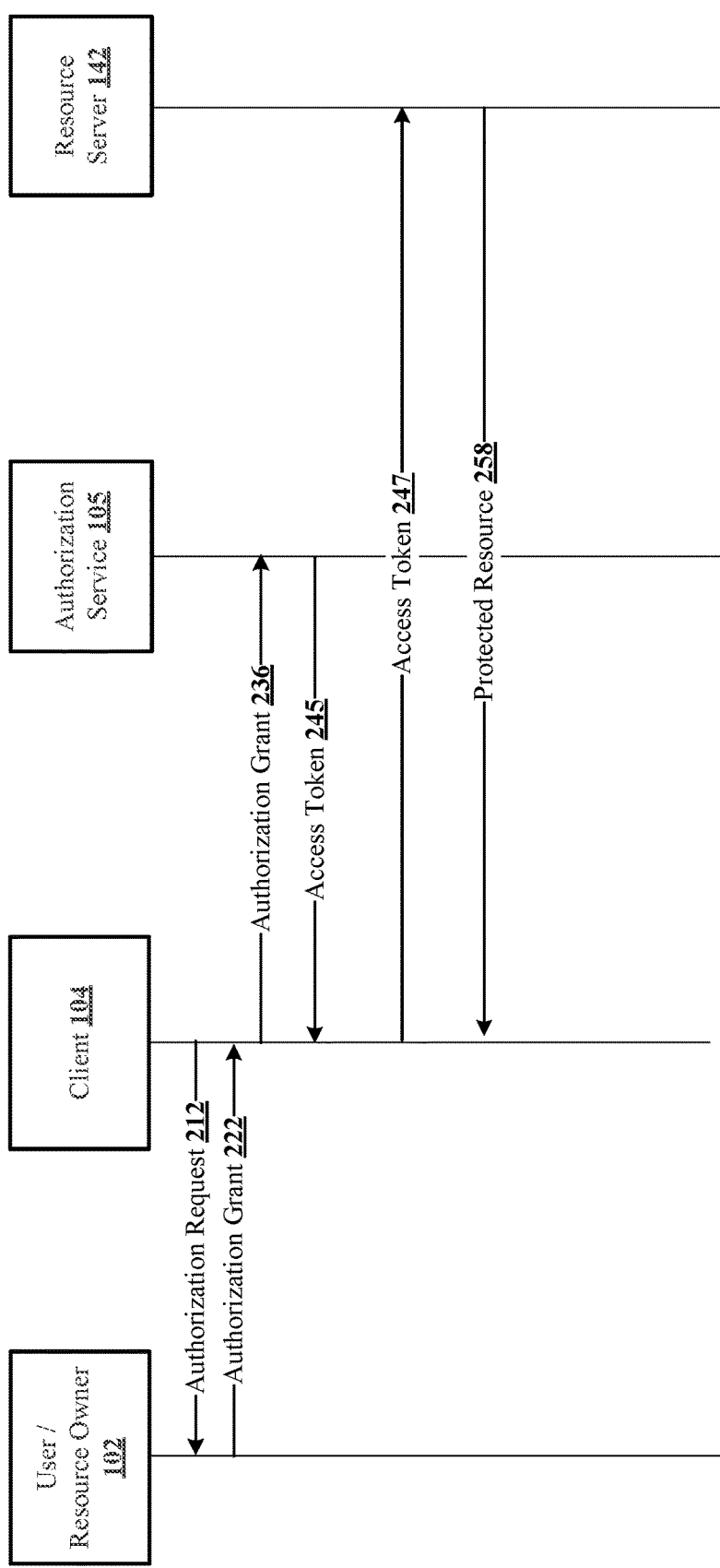
FIG. 2A OAuth 2.0 Protocol Flow

| OAuth2 622 ▷ 11 requests | |
|---|---|
| POST Get access Token | Params ○ Authorization Headers (10) Body Pre-request Script Tests Settings |
| POST Introspect token | ○ none ○ form-data ○ x-www-form-urlencoded ⊙ raw ○ binary ○ GraphQL   JSON ▽ |
| GET UserInfo | 1 { |
| POST Inspect macaroon | 2    "macaroon": "{{token}}" |
| POST Restrict macaroon | 3 } |
| POST Expire macaroon | |
| POST Add mTLS | |
| POST Refresh | |
| POST Restrict refresh token | Body Cookies Headers (9) Test Results |
| POST Add mTLS to refresh token | Pretty Raw Preview Visualize^BETA   JSON ▽   [⍈] |
| POST Introspect refresh token | 1 { |
| | 2   "identifier": "7uMoiSiTtrAe9QRkKnqIczjnTDU", |
| | 3   "location": "", |
| | 4   "caveats": [], |
| | 5   "signature": "cIp0zLb2NNEDNpCXWcq8A62eN6lma9CWYX538AQyQmw", |
| | 6 } |

FIG. 6

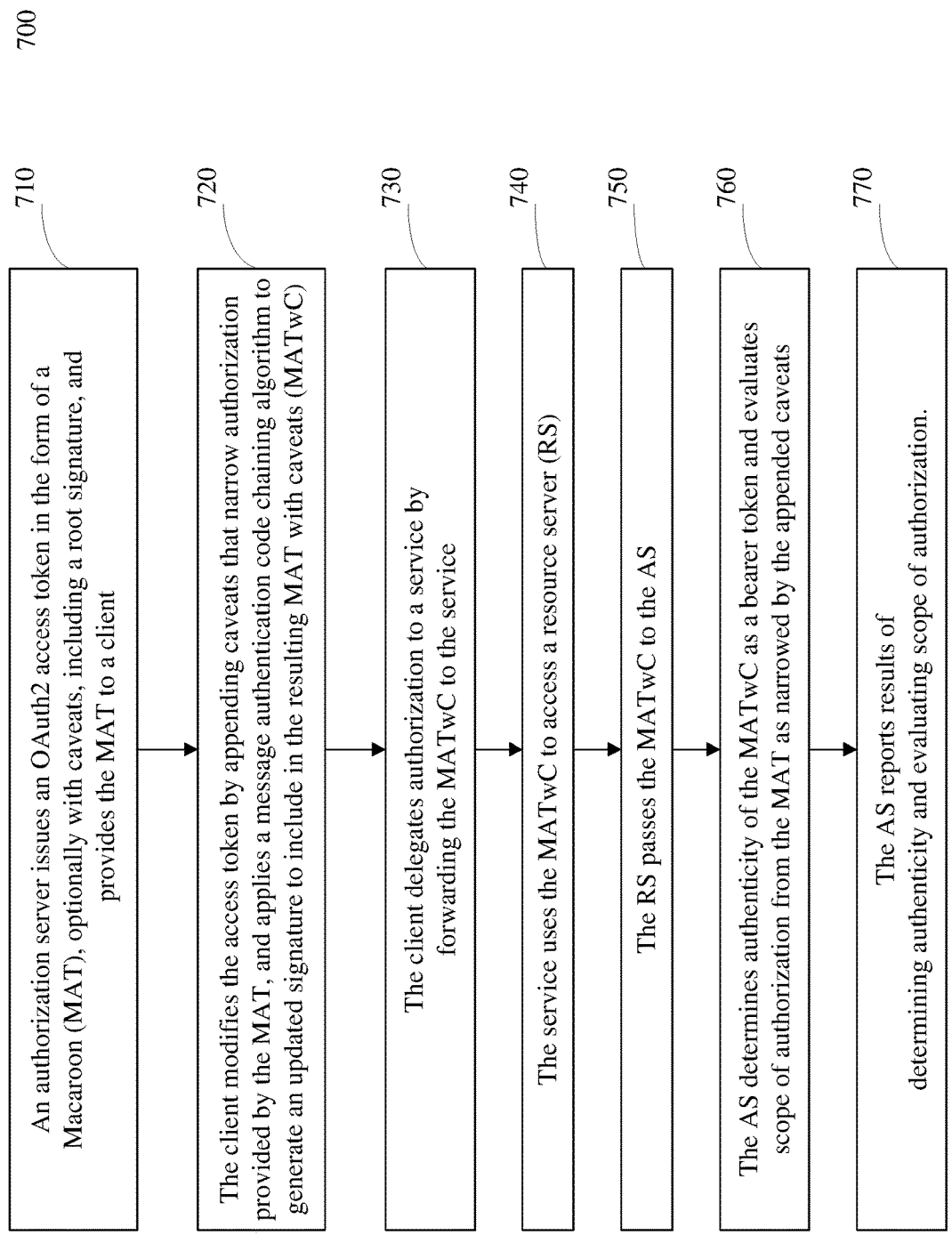
FIG. 7 – Confirming Delegation of Authorization from an Auth Server By a Client to a Service

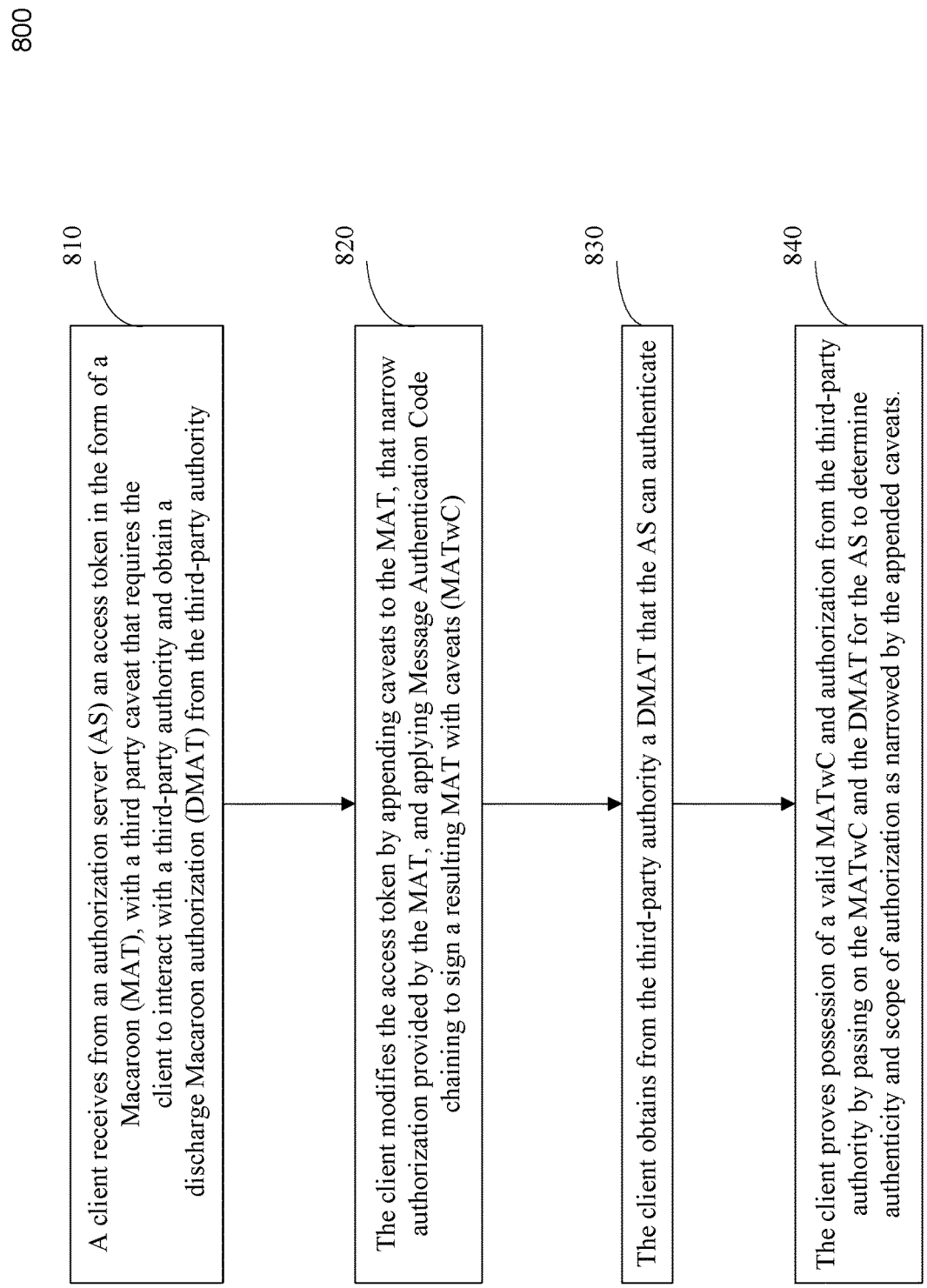
FIG. 8 – Secure Verification by a Third-Party Authority Using Bearer Tokens

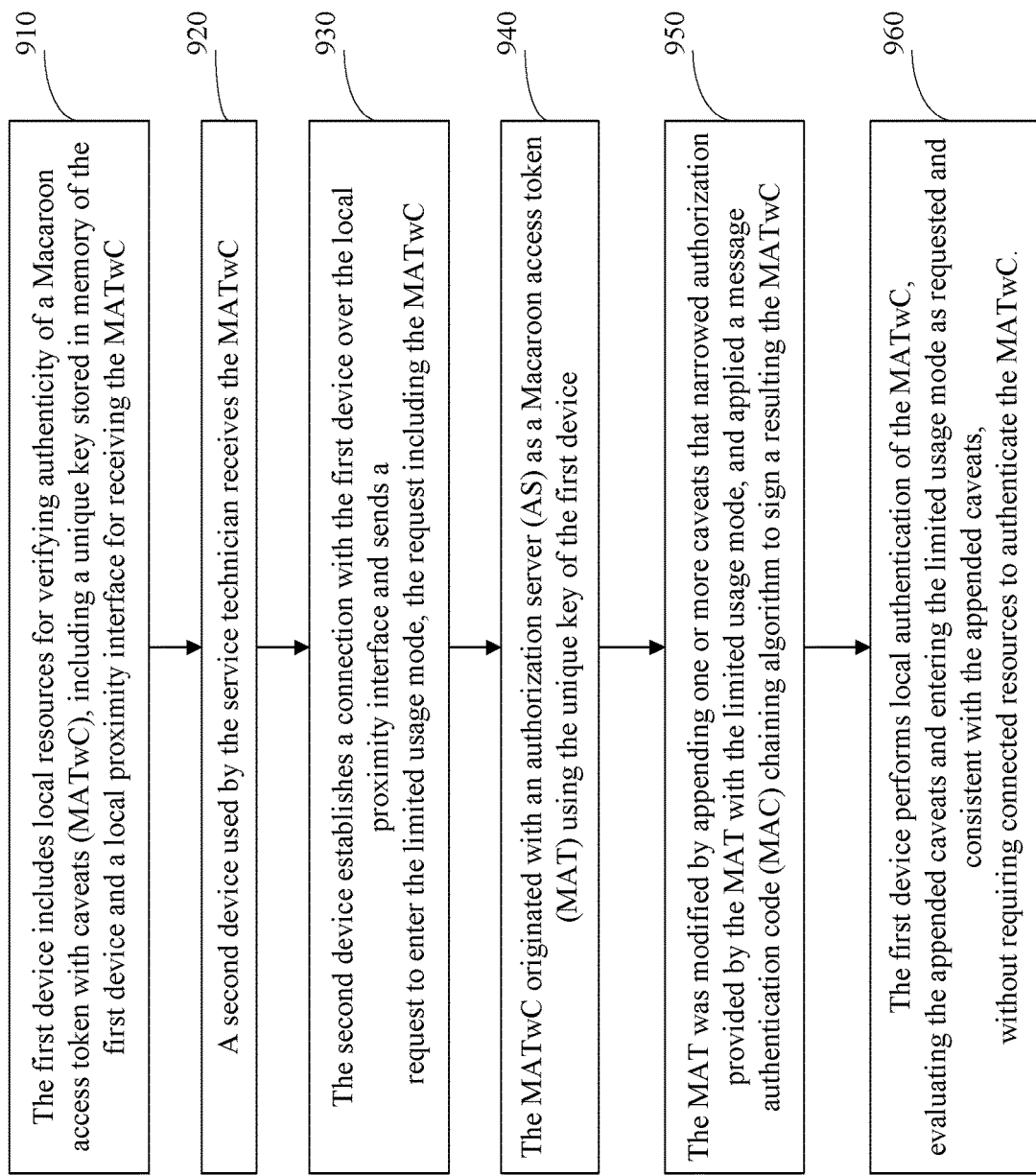
FIG. 9 – Limited Usage of IoT Devices without Requiring Connected Resources

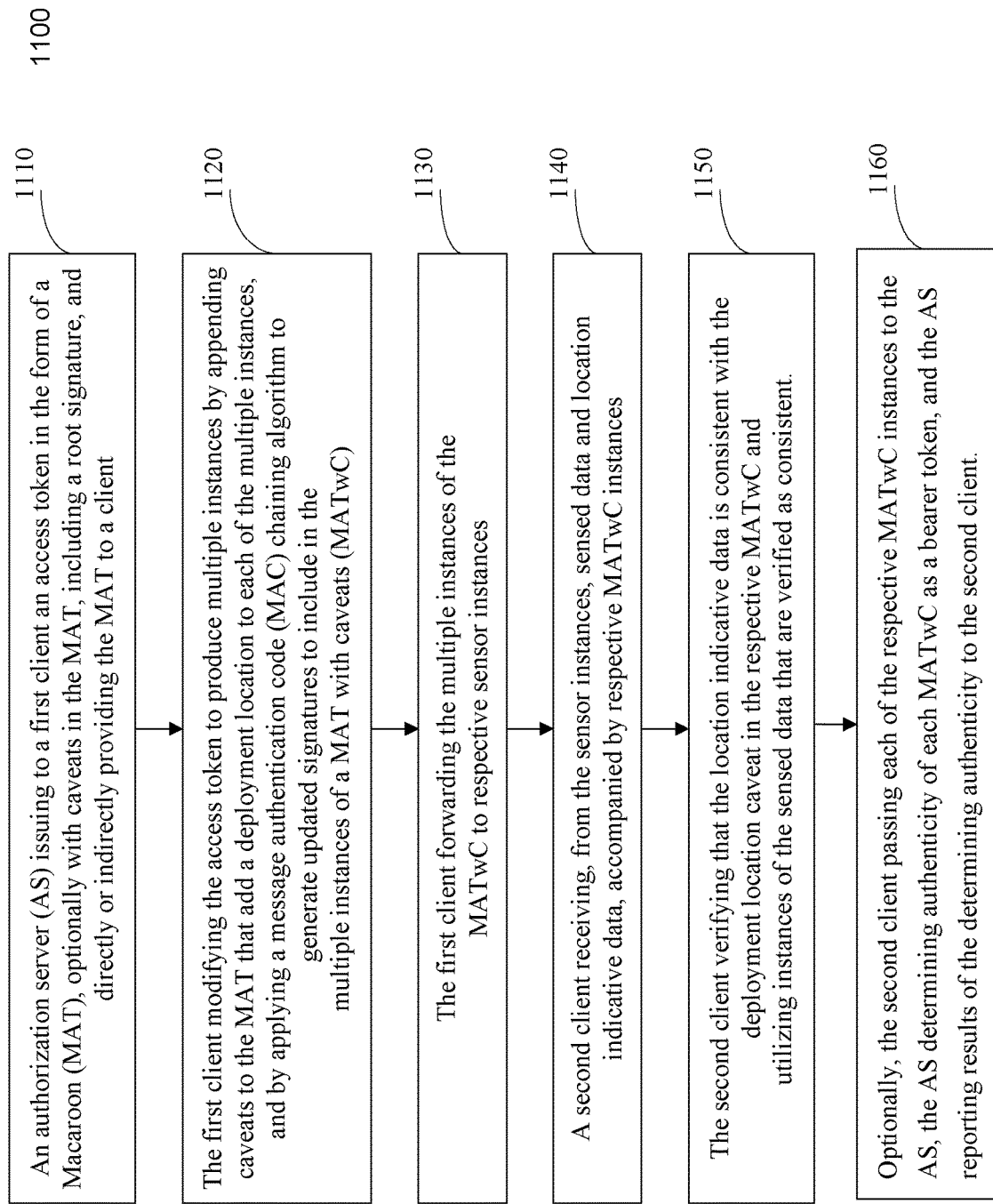
FIG. 11 – Secure Deployment Confirmation of IOT Devices Via Bearer Tokens

SECURE DEPLOYMENT CONFIRMATION OF IOT DEVICES VIA BEARER TOKENS WITH CAVEATS

PRIOR DISCLOSURES

Part of the technology disclosed in this application was previously disclosed by applicant in a posting entitled, "Least privilege with less effort: Macaroon access tokens in AM 7.0", Jul. 29, 2020 by Neil Madden, a posting entitled, "Macaroon access tokens for OAuth: Part 2—transactional auth" Sep. 9, 2020, by Neil Madden, and "Enabling the UK Open Banking Specification, A ForgeRock Technical Solution Guide" which are hereby incorporated by reference and which will be submitted with an Information Disclosure Statement. These prior disclosures are identified in accordance with MPEP 2153.01(a) & 608.01(a) and 37 CFR 1.77(b)(6).

RELATED APPLICATIONS

This application is related to U.S. application Ser. No. 16/579,740 titled: "Secure Service Isolation Between Instances of Cloud Products Using a SaaS Model", filed Oct. 1, 2019, now U.S. Pat. No. 10,817,346.

This application is also related to the following contemporaneously filed U.S. applications:

U.S. application Ser. No. 17/124,830 "Transparently Using Macaroons With Caveats to Delegate Authorization For Access", filed on 16 Dec. 2020 and U.S. application Ser. No. 17/124,901 "Secure Verification By A Third-Party Authority Using Bearer Tokens", filed on 16 Dec. 2020, and U.S. application Ser. No. 17/124,982 "Secure Activation, Service Mode Access and Usage Control of IOT Devices Using Bearer Tokens", filed on 16 Dec. 2020.

The related applications are incorporated by reference for all purposes.

FIELD OF THE TECHNOLOGY DISCLOSED

The technology disclosed relates generally to delegating authorization for access to resources. More specifically the disclosed technology relates to safely using access tokens for confirming delegation of authorization from an authorization server by a client to a service. The disclosed technology also relates to secure verification by a third-party authority using bearer tokens. Further, the disclosed technology relates to secure activation, service mode access, usage control and deployment confirmation of Internet of Things (IoT) devices without requiring connected resources to authenticate, using bearer tokens.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Authorization, the function of specifying access rights/privileges to resources, is related to information security and computer security in general and to access control. A typical authorization flow allows the approval of one application interacting with another on a user's behalf without giving away the user's password. In a typical authorization flow, a user is granting some part of their authority to an app or service for ongoing access. For example, an authorization service might grant an app read-only access to files in a user's Dropbox or Google Drive. In these cases, the scope of access is typically well defined, allowing the client to easily determine what scope to ask for, such as read-all-files, and the grant of authority creates a long-lived relationship between the user and the client. If the user stops using the app, or otherwise decides to end this relationship, they can typically go to a page on the authorization server and revoke access from that client.

In transactional authorization the setup is somewhat different. A paradigmatic example is of making a high-value bank transfer. Suppose a user wants to use an independently developed app to send $500 to their friend Alice. In a typical flow, an authorization provider would grant the app some static scope like bank-transfer, and then the app would be authorized to make any bank transfer on the user's behalf. But this is risky, unless the authorization provider fully trusts that app, because the app could then make lots of bank transfers that a user has not requested. One solution is to require authorization for each individual transfer. Then, when the user clicks the button to send $500 to Alice, the user's bank actively confirms this with the user outside of the app to make sure that the user intended to request this transaction. For this to work, the user needs to be told the details of the transaction they are approving, such as how much money is being transferred, from which account, and to whom. The set of scopes understood by an authorization server is typically fixed and independent of any particular request, so there is no easy way to encode the specific details of a transaction.

To get around the issue of encoding specific details of a transaction, some countries require that the payment details be registered with the bank first to obtain a Consent Id that is then included in the OAuth authorization request by using the OpenID Connect claims parameter. Open Banking standards specify the requirements in the UK (accessed Sep. 22, 2020). The patent applicant explains the use of the open banking specification in "Enabling the UK Open Banking Specification, A ForgeRock Technical Solution Guide", which is included by reference herein.

The mechanisms for getting around the issue of encoding details of a transaction are unwieldy. Proposals to add native support for transactions to OAuth 2, or to develop a new protocol that supports this, include a separate Internet Engineering Task Force (IETF) working group for "Grant Negotiation and Authorization Protocol (gnap)", accessed Sep. 22, 2020.

An opportunity arises for safely confirming delegation of authorization within an OAuth2 framework to overcome the issues described. Additionally, secure verification by a third-party authority using bearer tokens is offered, as well as secure activation, service mode access, usage control and deployment confirmation of IoT devices using bearer tokens.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 2A illustrates message flow for the OAuth 2.0 protocol for authorizing access to resources.

FIG. 6 shows an example user interface for applying Macaroons and caveats to OAuth2 for confirming delegation authorization from an authorization server by a client to a service.

FIG. 7 shows a representative workflow for confirming delegation of authorization from an authorization server (AS) by a client to a service.

FIG. 8 shows a representative workflow for secure verification by a third-party authority using bearer tokens.

FIG. 9 shows a representative workflow for providing limited usage of an IoT device without requiring connected resources for authentication.

FIG. 11 illustrates a representative workflow for confirming proper deployment of sensors without requiring connected resources for authentication.

DETAILED DESCRIPTION

Figure 1A:
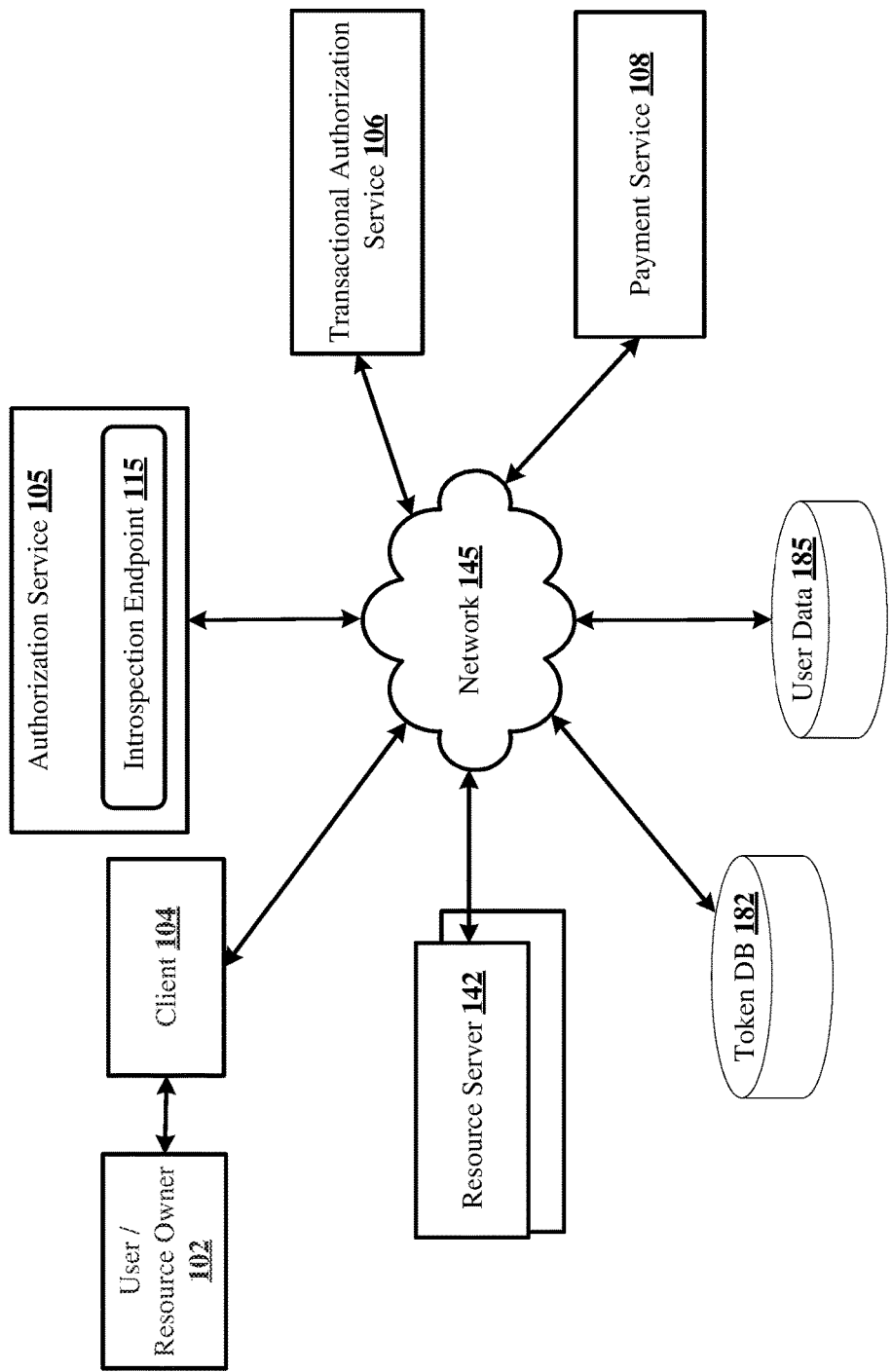
FIG. 1A shows an architectural level schematic of a system for delegating authorization with an OAuth2 framework for access to resources.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

OAuth 2.0 is an authorization protocol, described by the OAuth 2.0 Authorization Framework (RFC 6749), that allows the approval of one application interacting with another on a user's behalf without giving away the user's password. OAuth uses access tokens as credentials to prove that the client is authorized to make requests to service providers. Applications use access tokens to make Application Programming Interface (API) requests on behalf of a user. The access token represents the authorization of a specific application to access specific parts of a user's data. Access tokens must be kept confidential in transit and in storage, with the only parties seeing the access token being the application, authorization server and resource server; and the tokens only used over an https connection, which is an encrypted channel. OAuth 2.0 offers constrained access to web services without a requirement to expose user credentials to the client applications. In general, OAuth 2.0 access tokens can be associated to either a client application or to a particular user of the client.

Access tokens in a web browser environment need to be protected from malicious and compromised resource servers that can compromise the access tokens, which can result in increased risk of exposing users' data. Tokens can leak through open redirects, referer headers that contain the address of the previous web page from which a link to the currently requested page was followed, transport layer security (TLS) weaknesses such as Compression Ratio Info-leak Made Easy (CRIME) and Browser Reconnaissance and Exfiltration via Adaptive Compression of Hypertext (BREACH) security exploits over connections using the https protocol, and developer mistakes. Additionally, access tokens are not encrypted and can be read, and tokens can be refreshed once exfiltrated, even from different Internet Protocol (IP) addresses and a switch of account can occur without a multi-factor authentication prompt.

Proof-of-Possession (PoP) solutions have been used to try to prevent the risk of an access token being stolen from one request and used to authorize completely different requests that the client did not intend. "OAuth 2.0 Demonstration of Proof-of-Possession at the Application Layer (DPoP)" web authorization protocol describes the mechanism for sender-constraining OAuth 2.0 tokens via a proof-of-possession mechanism on the application level. Downsides for using DPoP tokens include the following. The client needs to generate and manage the secret key securely, which adds complexity that many client developers seek to avoid. The client, authorization server and resource servers all need to know about DPoP, so it can be challenging to incrementally deploy. DPoP relies on fresh public key signatures on every request, and public key cryptography is slow and expensive, so can require a significant increase in front-line servers to handle the extra load. Also, public key signature algorithms are fragile.

A different way to solve this problem would be to have individual access tokens for every request that authorizes one specific request and no others. The motivations for using bearer tokens as the access tokens are described in more detail by the patent's author Neil Madden in "Least privilege with less effort: Macaroon access tokens in AM 7.0", Jul. 29, 2020, and incorporated in full by reference herein.

The patent applicant discloses authorization services of access management (AM) that utilize macaroon access tokens as a lightweight and readily deployable alternative to PoP schemes for securing tokens in browser-based apps. The disclosed technology for access authorization in an OAuth2 framework utilizes well-defined parts of the OAuth 2 standard along with macaroons, a token format invented by Google. Disclosed authorization services grant access to resource controller backend services, and the resource controller can grant broad-based access tokens to an app server frontend service. The frontend app can add caveats to its access tokens and issue the restricted macaroon access tokens directly to users. For example, in one use case the macaroon access token includes a caveat that limits a session to ten minutes before the user times out. The disclosed techniques can also be adapted to secure access tokens in microservice architectures and IoT applications, as described later in this document.

The next section describes an architecture for delegating authorization within an OAuth2 framework for access to resources.

Architecture

FIG. 1A shows an architectural level block diagram of a system 100 for delegating authorization with an OAuth2 framework for access to resources. Because FIG. 1A is an architectural diagram, certain details are intentionally omitted to improve clarity of the description. The discussion of FIG. 1A is organized as follows. First, the elements of the figure are described, followed by their interconnections. Then, the use of the elements in the system are described in greater detail.

System 100 includes user/resource owner 102 who interacts with client 104 via computers, tablets, cell phones and smart watches. Browser-based applications and third-party applications can also be delivered on additional devices not mentioned here. System 100 also includes authorization service 105, a trusted authority that responds to requests for access, with access tokens. An access token is a sensitive value that represents an assertion from authorization service 105. The access token represents the authorization of a specific application to access specific parts of a user's data, stored in user data 185. Authorization service 105 generates and stores the access tokens in isolated memory, in token database 182, during operation. Access tokens are kept confidential in transit and in storage. Authorization service 105 also responds to requests for introspection, via introspection endpoint 115 for detecting and inspecting authorization tokens and appended caveats. Introspection endpoint 115 applies rules for interpreting the intersection of an original access token and associated caveats. Introspection endpoint 115 provides the overall scope for authorization server 105, which is the intersection of the macaroon access token and associated caveats, after determining how to reduce the access.

System 100 also includes resource server 142 that handles access-token-authenticated requests from an app, also referred to as client 104 herein, and network 145 which can be a public network or a private network, in different implementations. System 100 can include multiple applications and multiple resource servers. Browser-based applications and third party applications communicate with authorization service 105 and resource server 142 via posted messages.

System 100 can further include transactional authorization service 106 and payment service 108 for completing authorized financial transactions. Transactional authorization service 106 contacts user/resource owner 102 to authorize a transaction, confirming the intention to make the payment, using transactional authorization APIs, typically. Payment service 108 processes payment transactions requested by user/resource owner 102 via client 104, after the transaction has been authorized via authorization service 105. For each unique transaction, payment service 108 confirms the authenticity of transaction details and processes the payment transaction. An example payment service is Visa card services. An example authorized financial scenario is described relative to FIG. 2B later.

In the interconnection of the elements of system 100, network 145 couples user/resource owner 102 and client 104 running on computer, tablet, cell phone, smart watch, with authorization service 105 and resource server 142, transactional authorization service 106 and payment service 108 in communication. The communication path can be point-to-point over public and/or private networks. Communication can occur over a variety of networks, e.g. private networks, Virtual Private Network (VPN), Multi-protocol label switching (MLPS) circuit, or Internet, and can use appropriate application program interfaces (APIs) and data interchange formats, e.g. REpresentational State Transfer (REST), JavaScript Object Notation (JSON), eXtensible Markup Language (XML), Simple Object Access Protocol (SOAP). The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as Enhanced Data GSM Evolution (EDGE), 3G, 4G, Long Term Evolution (LTE).

Further continuing with the description of the system 100, components of FIG. 1A are implemented by software running on varying types of computing devices. Example devices are a workstation, a server, a computing cluster, a blade server, and a server farm, or any other data processing system or computing device. An engine (such as the Message Authentication Code chaining engine discussed below) can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Figure 1B:
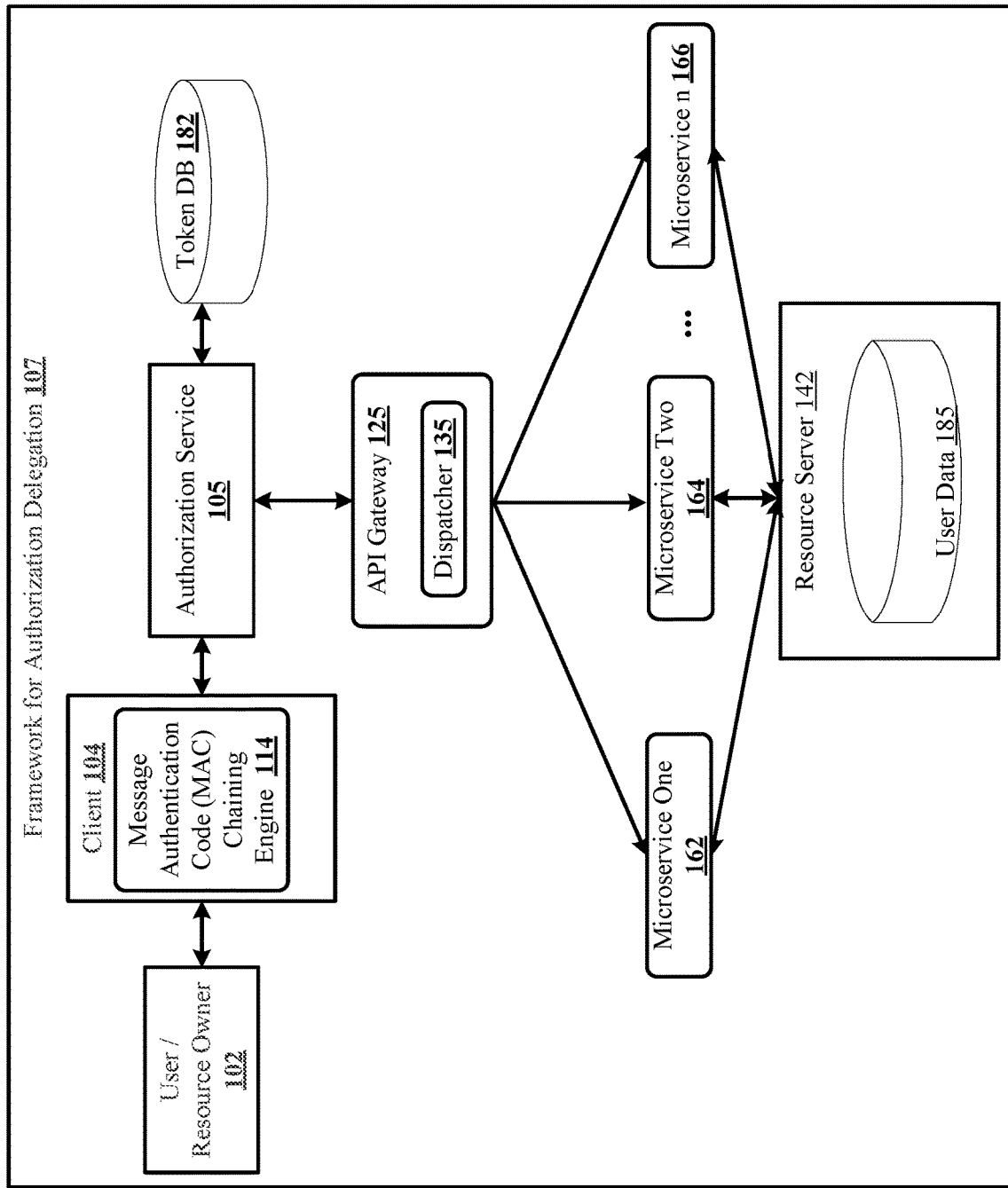
FIG. 1B shows a block diagram of a system for delegating authorization with an OAuth2 framework, for access by microservices to resources.

FIG. 1B shows a block diagram of an example system with microservices, with framework for authorization delegation 107, in which multiple microservices each gain access to resources through an API gateway for edge computing services. Rather than issuing multiple access tokens with different scopes for a set of microservices, authorization service 105 issues an access token in the form of a macaroon (MAT) with a broad scope to API gateway 125, which can then create as many macaroons as needed from the single macaroon access token, restricting their scopes as required by using caveats. (Authorization service 105 can issue a MAT with caveats, optionally.) This is very useful, for example, in a microservice architecture in which a single client can delegate tasks to other services, with a limited set of capabilities or bound by certain restrictions. In this example case, user/resource owner 102 interacts with client 104, as described relative to FIG. 1A. Message authentication code (MAC) chaining engine 114 applies an algorithm for generating an updated signature to include in resulting macaroons (MAT) with caveats (MATwC) as described relative to FIG. 3 later. Authorization service 105 responds to a request for access, providing an access token which represents the authorization for a user of a specific application to access specific user data, stored in user data 185. Authorization service 105 generates and stores the access tokens in isolated memory, in token database 182, during operation. Authorization service 105 also responds to requests for introspection, taking token attributes and restrictions in caveats and combining them into a single response. An example original access token, with scope a b c d and a specific expiry time and audience, is stored in the token database and is listed next. Macaroon "active": true prevents clients from extracting an original macaroon from token database 182 and using it to access resource server 142 and user data 185.

"active": true,
"scope": "a b c d",
"exp": 1601309950,
"aud": ["api.example.com" ]

A client accesses resource server with the access token with added caveats "exp": 1601309899, "scope": "b c"}. The introspection response is listed next, in which the scope and expiry time have been narrowed, due to the added caveats.

"active": true,
"exp": 1601309899,
"scope": "b c",
"aud": ["api.example.com" ]

The system also includes API gateway 125 between authorization service 105 and a collection of backend services: microservice one 162, microservice two 164 to microservice n 166. Authorization service 105 generates and sends a broadly-scoped access token to API gateway which accepts application programming interface (API) calls from client 104 and aggregates the various services required to fulfill them. Dispatcher 135 dispatches finely narrowed macaroon access tokens with caveats specific to each of microservice one 162, microservice two 164 to microservice n 166. Resource server 142 handles access-token-authenticated requests from the microservices. The user data for each of microservice one 162, microservice two 164 to microservice n 166 is stored and accessible separately in user data 185.

FIG. 2A illustrates message flow 200 for the OAuth 2.0 protocol for authorizing access to resources. User/resource owner 102 is the owner of the resources; in one example, a user who has several photos stored in a photo-sharing service. User/resource owner 102 can utilize a user-agent, typically a web browser, to communicate with client 104, a third-party application that wants to obtain access to the resources. Client 104 makes authorization requests 212 on behalf of user/resource owner 102 and receives authorization grant 222. In one example, a printing service needs to access the resource owner's photos to print them. Client 104 transmits authorization grant 236 to authorization service 105 which issues access tokens 245 for authenticating client 104. Authorization service 105 tracks the validity of the tokens which validate that user/resource owner 102 authorizes client 104 to act on their behalf over specific resources during a limited amount of time. Resource server 142, the service hosting the protected resources—for example, a photo-sharing service, receives access token 247 from authorization service 105, validates the tokens issued by authorization service 105 and provides protected resource 258 to client 104. A website protected by a web or a Java agent can act as the resource server, in one implementation.

Access tokens are short-lived because, if leaked, they grant potentially malicious users access to the resource owner resources. However, clients may need to access the protected data for periods of time that exceed the access token lifetime or when the resource owner is not available. In some cases, it is unreasonable to ask for the resource owner's consent several times during the same operation.

Refresh tokens solve this problem by letting clients ask for a new access token without further interaction from the resource owner. While a potentially malicious user compromising an access token has access to the resource owner resources, one that holds a refresh token also needs to compromise the client ID and the client secret to be able to get an access token, since the client needs to authenticate to the token endpoint to obtain an access token using the refresh token.

OAuth 2 access tokens are bearer tokens, which utilize a simple token format, like HS256 JSON web tokens (JWTs). If a service knows the value of the token they can use it, without needing other credentials. Macaroons are a type of bearer token that can be used when issuing OAuth 2.0 access and refresh tokens. They can be used in place of regular access or refresh tokens, as they allow the sharing of a single token with multiple clients and resource servers without compromising security. A contextual caveat modifies a macaroon. The idea is that, rather than issuing multiple access tokens with different scopes for a set of clients, the disclosed access management service issues a macaroon access token with a broad scope, to a client. The client then creates as many macaroons as needed from the single macaroon access token, restricting their scopes as required, by using caveats.

Caveats restrictions placed on a macaroon must be satisfied before using the token. In one example restriction, if the expiry time is past, the token is invalid. This is very useful, for example, in a microservice architecture in which a single client can delegate tasks to other services, with a limited set of capabilities or bound by certain restrictions. An example access token macaroon is listed next, encoded in base64.

MDAwZWxvY2F0aW9uIAowMDJiaWR1bnRpZmllciB
fSnBxZkJrbWZFUDlqYkNBbEJs
W19sYThwS1kKMDA1N2NpZCB7ICJzY29wZSI6I
CJvcGVuaWQgcHJvZmlsZSIsICJleHA
iOiAxNjAxMzA5ODk5LCAiYXVkIjogWyAiYXBpL
mV4YW1wbGUuY29tIiBdIHOKMD
AyZnNpZ25hdHVyZSBfxDGx83h5hMZY6sokQXk2
KBTEs3vGxlfL9orpZj-Ao The JSON structure of the caveat ("cid") is listed next, with each key-value pair in the JSON object listed separately, for scope, expiry and audience.

location
identifier_JpqffikmfEP9jbCA1BlZ_la8pJY
cid "scope": "openid profile", "exp": 1601309899, "aud": ["api.example.com" ]
signature 5fc431b1f3787984c658eaca24417936281f d313fb37bc6c657cbf68ae9663f3

Caveats that can be satisfied locally are referred to as first-party caveats. Caveat examples include scope, expiry time, confirmation key and audience of the token. Scope is a space-separated string, as described in OAuth 2.0 Authorization Framework (RFC 6749) Section 3.3. Scope restricts the scope of the token. The returned scope will be the intersection of the original token scope and any scope caveats. Expiry time restricts the expiry time of the token; exp is expressed as the number of seconds since midnight UTC on the 1st January 1970, as described in OAuth 2.0 Authorization Framework (RFC 6749) Section 4.1.4. The effective expiry time is the minimum of the original expiry time and any expiry caveats added to the token. If more than one exp caveat is appended, the most restrictive one applies.

Confirmation key caveat 'cnf' adds a confirmation key to a token that requires the client to prove possession of the associated key whenever they use the token, with the semantics originally specified in "RFC 7800 Proof-of-Possession Key Semantics for JSON Web Tokens JWTs", accessed Oct. 7, 2020. The disclosed technology adds to cnf the ability to specify this as a caveat which can be added only once: either when the token is originally issued or once as a macaroon if the original token did not have one. Attempting to add a second confirmation key caveat invalidates the token. Cnf binds the access token to a client certificate. That is, a client can be issued with a regular access token and then can later bind it to their client certificate. Only one client certificate can be bound to the macaroon. Any attempt to bind a new certificate with subsequent caveats is ignored.

Audience caveat 'aud' restricts the audience of the token, as described in OAuth 2.0 Authorization Framework (RFC 6749) Section 4.1.3. The effective audience of the token is the intersection of the original audience of the token and any audience caveats attached to it. For access tokens that do not have an audience when issued, the disclosed technology treats this condition as an all-encompassing universal audience so that the intersection operates as expected. The effective audience is the intersection of any audience restriction and any aud caveats.

The cnf caveat constrains who is allowed to use/send the Access Token (AT) on requests, while aud constrains who is allowed to receive the AT— that is, to process a request. An example that includes four types of caveats is shown next.

```
"caveat": {
  "type": "first-party",
  "identifier": {
    "scope": "openid profile",
    "exp": 1602864203,
    "aud": [ "api1.example.com", "api2.example.com" ],
    "cnf: {
      "x5t#S256": "Bs7uZKUt7ra4h0xdSz6AHtAYakG3zU20NeJW7z8GKBc"
    }
  }
}
```

Caveats satisfied by a service external to access management services are referred to as third-party caveats. Third-party caveats are those that require the client to use a service other than the disclosed access management service to get proof that the condition specified by the caveat is satisfied. They are useful in situations in which a user's services external to the access management service can make additional authorization checks relevant to the access token. One example is a case with a service external to access management services, akin to an identity provider (IDP) in a security assertion markup language (SAML) v2.0 architecture, that can be queried to determine whether the user related to the access token belongs to a particular user group. The proof that the condition is satisfied is returned by the third party in a discharge macaroon, and the client presents both the access token macaroon and the discharge macaroon to get access to the resource.

The discharge macaroon can also have first-party caveats attached to it, such as expiry time. This allows for authorization flows in which the access token macaroon is long-lived and the discharge macaroon is not, which forces the client to acquire a new discharge macaroon each time they access the resource. Any first-party caveats attached to the discharge macaroons can be treated as if they were caveats on the access token itself. For example, if the discharge macaroon limits the expiry time to five minutes, the introspection response can list the expiry time of the access token as five minutes even if the access token was valid for longer, in some implementations. We provide further descriptions and examples later.

Figure 2B:
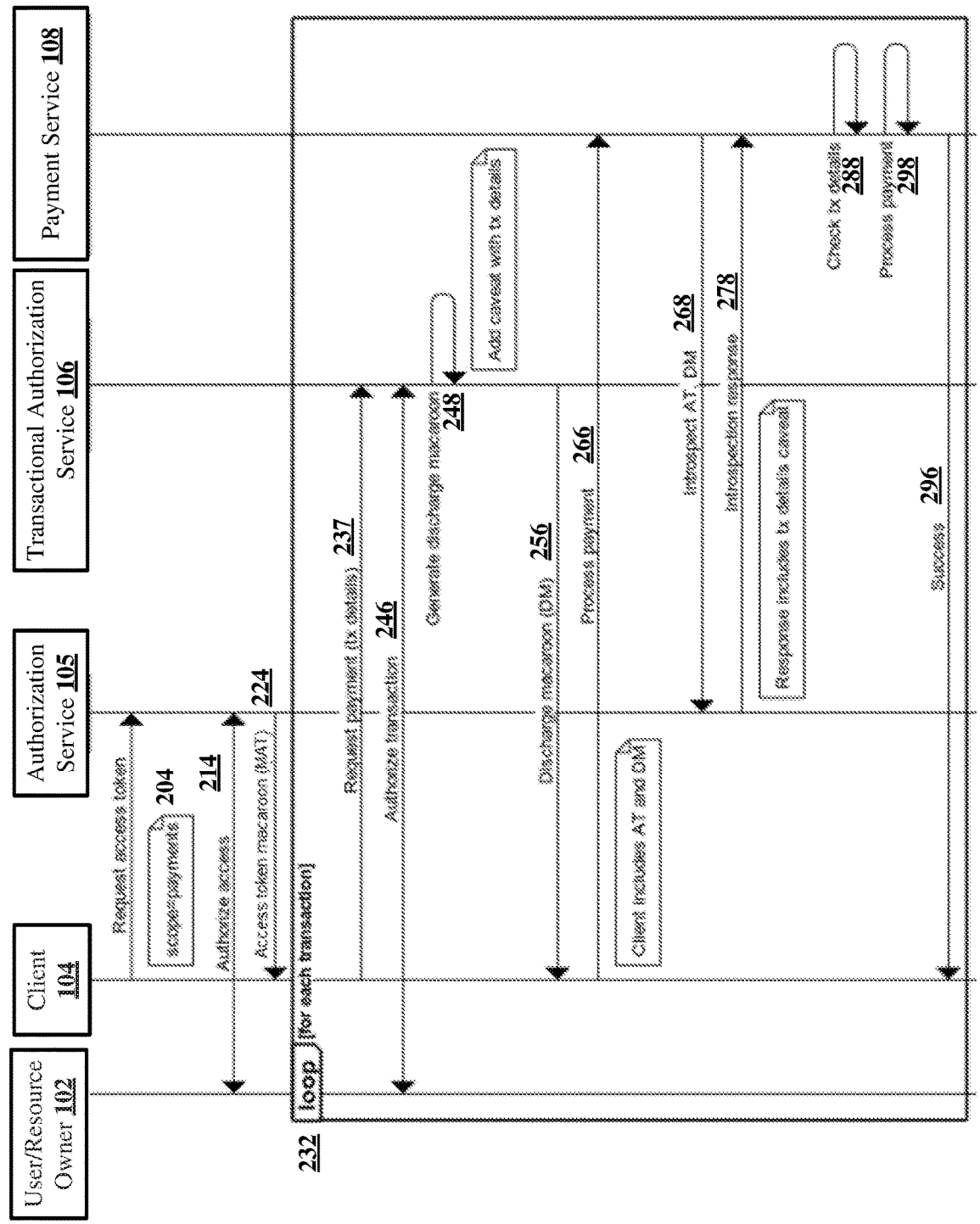
FIG. 2B illustrates transaction authorization message flow for secure verification by a third party authority using bearer tokens.

FIG. 2B illustrates OAuth2 transaction authorization message flow for secure verification by a third party authority using bearer tokens. For this example use case, a payment is tied to a unique transaction. Message flow 210 includes creating a macaroon access token containing a third-party caveat that requires the client to obtain a one-time discharge macaroon from an external transactional service. A third-party caveat has the following parts: (a) a hint describing where the client can find the third-party service, which is usually a Uniform Resource Locator (URL); (b) a unique secret key to sign discharge macaroons, known as the discharge key; and (c) an identifier for the third-party service to know which condition needs to be checked, and how to recover the discharge key. In the flow, client 204 first requests a long-lived access token, and refresh token if desired, from authorization service 105, with a broad scope such as payments 204. Authorization service 105 authorizes access 214 to user/resource owner 102. An example of code for getting the access token from authorization service 105 is listed next, in which 'openam' is the authorization service name.

```
ACCESS_TOKEN=$(curl -u test:password -d
  'grant_type=password&
    scope=payments&username=demo&password=
    changeit'
hxxps://openam.example.TX=$(cat tx.json)
```

This access token represents permission from the user to initiate payment transactions and represents a long-term relationship between user/resource owner 102 and client 104. Authorization service 105 issues macaroon access token (MAT) 224 with a 3rd-party caveat MATwC) that allows it to only be used when accompanied by a discharge macaroon from transactional authorization service 106. Transactional authorization service 106 adds a 3rd-party caveat via an access token modification script in one implementation.

Continuing the description of transaction authorization message flow 210, we describe a set of steps for one transaction, encircled in loop 232. To initiate a payment, client 104 sends its access token along with the transaction details 237 to transactional authorization service 106. Transactional authorization service 106 contacts user/resource owner 102 to authorize the transaction 246 confirming the intention to make the payment, using transactional authorization APIs, in one example. Code for authorizing a transaction to obtain a discharge macaroon is listed next.

```
TX=$(cat tx.json)
DISCHARGE=$(curl  -H  "Authorization:  Bearer
  $ACCESS_TOKEN"-d $TX
hxxp://127.0.0.1:4567/auth|jq -r.discharge)
```

If user/resource owner 102 approves the transaction, transactional authorization service 106 generates and issues a discharge macaroon 248 that matches the 3rd-party caveat in access token 224. The 3rd party caveat includes a discharge key, which gets added twice, once encrypted in such a way that a service verifying the Macaroon can decrypt it, and once encrypted using a key for payment service 108. Client 104 calls payment service 108 and passes the encrypted 3rd party caveat. Payment service 108 decrypts the discharge key from that caveat, which would also have info about the information being requested. Payment service 108 uses this discharge key to sign the discharge macaroon. Payment service 108 calls authorization service 105 to introspect AT with discharge Macaroon 268, in process of verifying Macaroon, when it gets to that 3rd party caveat it will be able to decrypt the discharge key and have its own copy so it can verify the signature on the discharge macaroon, so to know the call must be from payment service 108.

Encrypting the discharge key can be bulky, expanding the size of the Macaroon. As an alternative for adding the 3rd party caveat, authorization service 105 can contact payment service 108 to store the caveat, thus pre-registering itself. In that scenario, payment service 108 can store a unique identifier, referred to as a "ticket", for the caveat in a database. Payment service 108 would then use that ticket instead of directly including a discharge key in the introspection request sent to authorization service 105. In this scenario, when asked to complete the transaction, payment service 108 would locate the discharge key stored in the database, utilizing the "ticket" as the index to locate the discharge key with the stored caveat(s).

Transactional authorization service 106 appends a caveat tying discharge macaroon 248 to the transaction details and can add other caveats, such as limiting the expiry time. Client 104 sends a process payment message 266 with the access token, discharge macaroon, and transaction details to payment service 108. Example code for making the payment request to payment service 108 is listed next.

curl -H "Authorization: Bearer $ACCESS_TOKEN"-d "{\"tx\": $TX, \"tx_auth\": \"$DISCHARGE\"}" -i hxxp://127.0.0.1:12345

Payment service 108 sends to introspection endpoint 115 of authorization service 105 a request for introspection 268 of the access token, passing the discharge macaroon as a header, in one example, to check that the client is authorized. If the access token or discharge macaroon is not valid then the request will be rejected. Authorization service 105 returns the expected transaction details in introspection response 278, from the caveat on the discharge macaroon. Payment service 108 checks the transactional details 288 and verifies that they match the submitted transaction. If all checks pass, then payment service 108 processes the payment transaction 298 and sends a success message 296 to client 104. Additional transactions can complete the set of steps encircled in loop 232.

Figure 3:
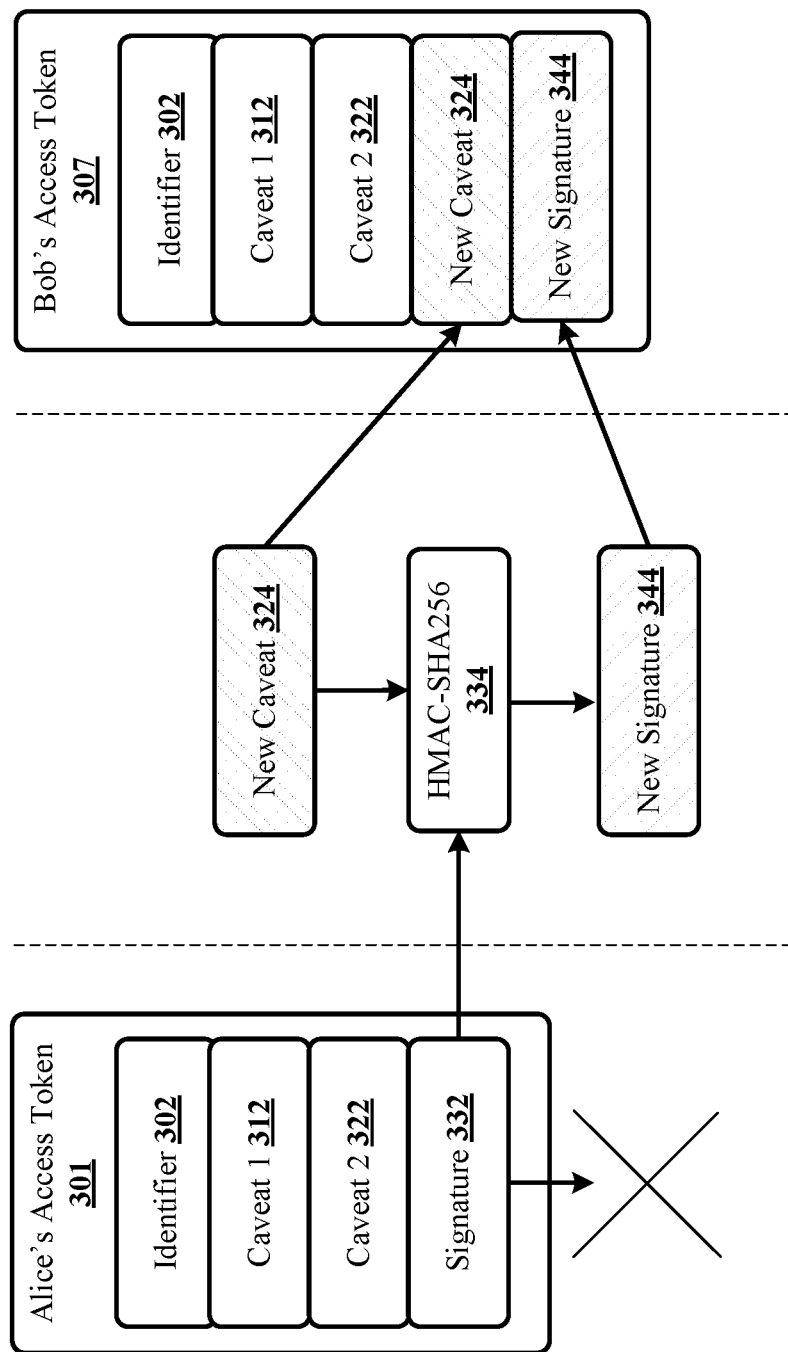
FIG. 3 illustrates the process for creating a macaroon with restricted permissions, from an existing macaroon access token, by appending a new caveat to an existing access token.

FIG. 3 illustrates the process for creating a macaroon with restricted permissions, from an existing macaroon access token, by appending a new caveat to an existing access token. An initial macaroon has more privilege and each added contextual caveat adds further restrictions, so that the resultant macaroon access token has less privilege. Application of a message authentication code (abbreviated MAC) chaining algorithm generates an updated signature to include in the resulting MAT with caveats (MATwC). One implementation includes applying a hash-based message authentication code (HMAC) chaining algorithm to generate the updated signature, including using the root signature as a key for the HMAC and excluding the root signature from content of the MATwC. In one example, symmetric algorithm HS256 uses a hash-based message authentication code (HMAC) with Secure Hash Algorithm 256 (SHA-256). Authorization service 105 is able to confirm the signature in the MATwC because it knows a signature applied to the MAT and intermediate signatures, if any, generated during HMAC chaining to produce the signature in the MATwC to be authenticated.

Continuing the description, FIG. 3 shows an example of adding a new caveat to an existing macaroon access token with an existing signature. Alice's access token 301 includes a key identifier 302, caveat 1 312, caveat 2 322 and initial signature 332 generated using a root secret key. When a caveat is added to Alice's access token 301 to generate Bob's macaroon access token 307, the existing signature 332 of Alice's access token 301 is used as a key to apply HMAC-SHA256 chaining algorithm 334. Then the existing signature 332 is discarded and the new caveat 324 is fed into the HMAC-SHA256 chaining algorithm 334 to generate the new signature 344. Bob's access token 307 includes key identifier 302, caveat 1 312 and caveat 2 322, the same as for Alice's access token, along with appended new caveat 324 and new signature 344 generated as described. In one example, Alice is a client and Bob is a resource server for API requests. Alice's access token 301 can be used to make many macaroons, with a spectrum of privilege. Verification of HMAC signatures can be orders of magnitude faster, at approximately 2 microseconds compared to one to ten milliseconds required for public key signatures.

Mutual TLS (mTLS) authentication ensures that traffic is both secure and trusted in both directions between a client and server. It allows requests that do not log in with an identity provider to demonstrate that they can reach a given resource. Mutual TLS is designed to prevent multiple hops of authentication passing.

Clients can authenticate to authentication service 105 by using mutual transport layer security (mTLS) authentication and X.509 certificates that are either self-signed, or that use public key infrastructure (PKI), as described in specification: "RFC 8705 OAuth 2.0 Mutual TLS Client Authentication and Certificate Bound Access Tokens". That is, OAuth authorization servers are provided a mechanism for binding access tokens to a client's mutual-TLS certificate, and OAuth protected resources are provided a method for ensuring that such an access token presented to it was issued to the client presenting the token. When mutual TLS authentication is used by the client on the connection to the token endpoint, the authorization server is able to bind the issued access token to the client certificate. Such a binding is accomplished by associating the certificate with the token in a way that can be accessed by the protected resource.

When an access token is tied to a secret key, the resultant token cannot be shared with any other service because the other service will not have access to the key, so would not be able to use the access token.

Figure 4:
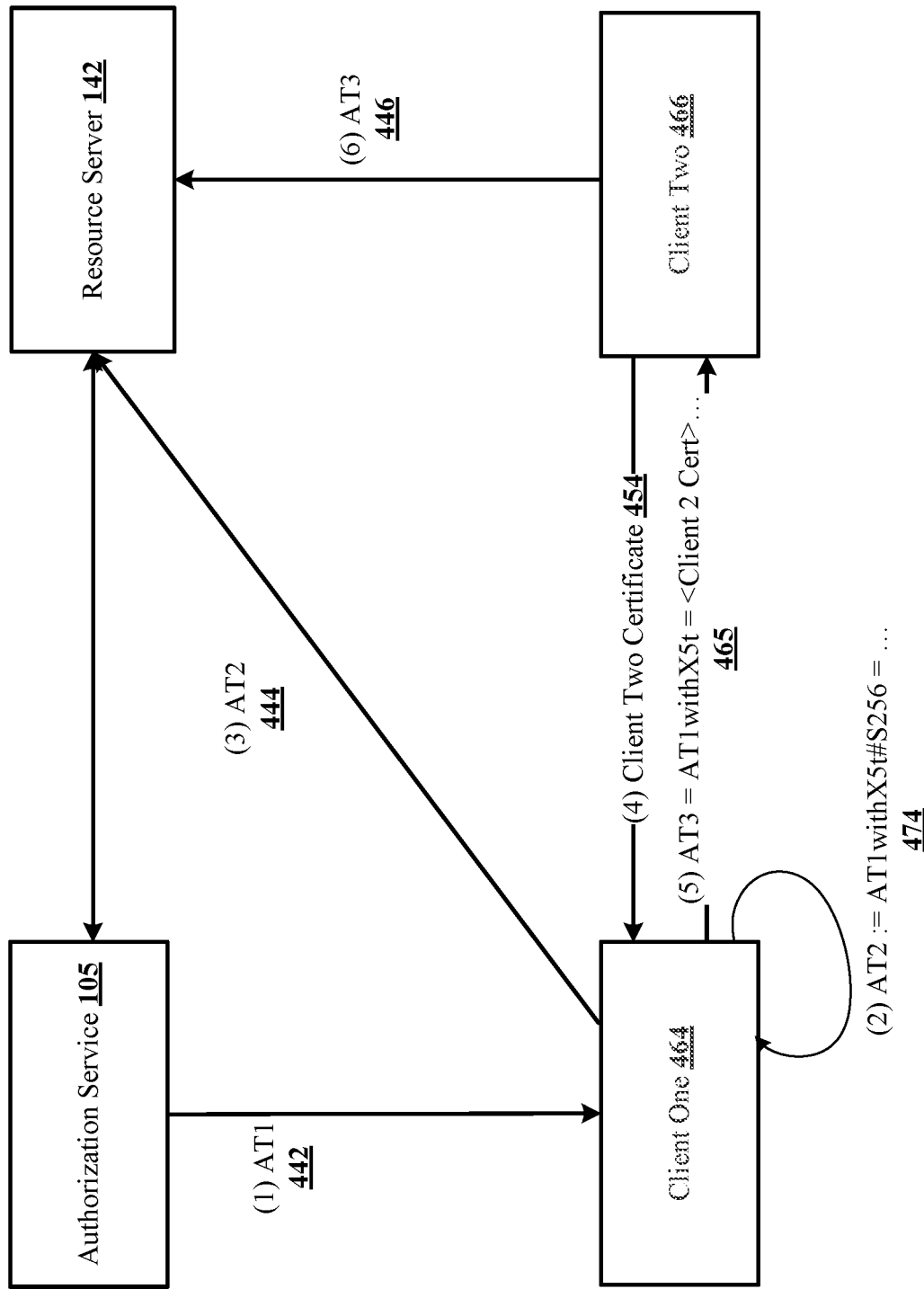
FIG. 4 illustrates the process for confirming delegation authorization from an authorization server by a client to a service, via the use of confirmation keys for associating the access token with a key for which possession must be proved to use the token.

FIG. 4 illustrates the process for confirming delegation of authorization from an authorization server (AS) by a client to a service via the use of confirmation keys for associating the access token with a key for which possession must be proved to use the token. One client can provide an access token to a second client, which can then access a resource server without needing to authenticate their user/resource holder. This typically occurs in microservices environments in which a single request may get passed from one service to another as part of processing. In one use case example, an initial call to place an order might result in subsequent calls to a billing service, a stock checking service, and then to a fulfilment service of some kind. Each of those services may need to access different distinct details about the user from a "user info" resource server. An initial access token granting access to that user info can be transferred from one service to the next as processing proceeds.

Continuing the description of FIG. 4, authorization service 105 has access to keys for verifying and signing macaroon access tokens. In this example, authorization service 105 issues an OA2 access token in the form of a Macaroon (MAT) optionally with caveats in the MAT, including a root signature, and directly or indirectly provides the MAT to client one 464 as an unconstrained, unrestricted access token AT1 442 that is not attached to any key, also referred to as a client certificate. Client one 464 can make two copies of the access token. Client one 464 modifies the OA2 access token by appending caveats to the MAT that narrow authorization provided by the MAT, and by applying a message authentication code (MAC) chaining algorithm to generate an updated signature to include in the resulting MAT with caveats (MATwC). FIG. 4 illustrates client one 464 locally adding a caveat with mTLS restriction AT2 474. Client one 464 can access resource server 142 using AT2 444 associated with the client one secret key. AT2 can only be used by a client that can prove possession of private key corresponding to client one certificate. If anyone intercepts (steals) AT2, they cannot use without compromising the client one private key.

Also shown in FIG. 4, client two 466 provides client two certificate 454 to client one 464. Client one 464 appends a caveat with the thumbprint of client two certificate to generate macaroon access token AT3 465. Client one 464 can safely send macaroon access token AT3 465 to client two 466, even over an unsecured channel. Even if the access token were intercepted, the interceptor would not be able to use the intercepted access token because they would not have access to the private key.

Continuing the description of the use of confirmation keys for associating the access token, client two 466 can access resource server 142 by presenting macaroon access token AT3 446, which includes the caveat that associates the access token with client two's certificate 454. Client two 466 presents access token AT3 446 to resource server 142. Resource server 142 calls back into introspection endpoint 115 of authorization service 105 to validate, and authorization service 105 recognizes the thumbprint and returns it to resource server 142. Resource server 142 checks to ensure the thumbprint matches. Client two 466 authorizes client one 464 to use the token with the client two thumbprint by providing the client two certificate 454 to client one 464. The macaroon access token AT3 446 tells resource server 142 access is only granted with the key that includes the client two thumbprint. The thumbprint is also known as a cryptographic hash, as a message digest, as described in specification: "RFC 8705 OAuth 2.0 Mutual TLS Client Authentication and Certificate Bound Access Tokens".

IoT Use Cases

Internet of things (IoT) servicing can apply to a home appliance, serviced on site, or a car driven to the mechanic. IoT devices often implement computing at a localized resource service. The original AS may be the manufacturer, which delegates to dealers (via a caveat on an existing key for a particular vehicle), rental agencies or authorized service agencies. A dealer, as opposed to factory authorized service, may delegate to the appliance owner. The first client delegate further delegates to a second on-site service rep or a mechanic shop. The second client could carry the token in a fob or an app running on a mobile device. The RS built into the IoT device is capable of verifying/authenticating a token, using a factory-installed shared secret key. This factory-installed secret allows it to authenticate the token with caveats, without needing to contact the AS. Some appliances are Internet enabled and will be in contact with an edge computing service.

Figure 5:
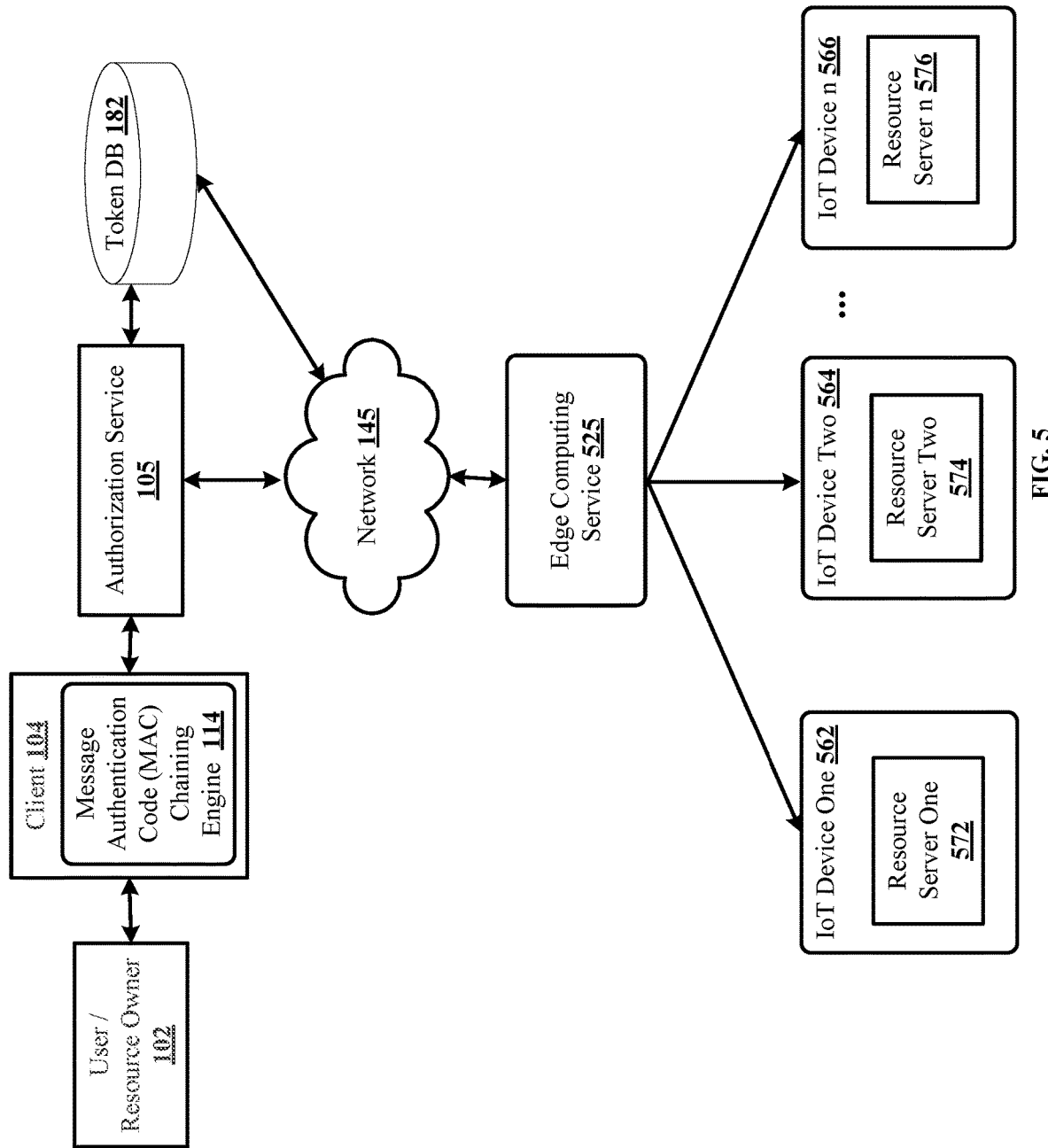
FIG. 5 shows a block diagram for a system for secure verification by a third-party authority using bearer tokens, which can be utilized via an edge computing service with Internet of things (IoT) devices.

FIG. 5 shows a block diagram for a system for secure verification by a third-party authority using bearer tokens, with Internet of things (IoT) devices. Each IoT device includes local resources for verifying authenticity of a Macaroon authorization token with caveats (MATwC), including a unique key and a local proximity interface for receiving the MATwC. User/resource owner 102 interacts with client 104, as described relative to FIG. 1A. Message authentication code (MAC) chaining engine 114 applies an algorithm for generating an updated signature to include in resulting macaroons (MAT) with caveats (MATwC) as described relative to FIG. 3. Authorization service 105 responds to a request for access, providing an access token which represents the authorization for a user of a specific application to access specific IoT device. Authorization service 105 generates and stores access tokens in isolated memory, in token database 182, during setup, such as at a vehicle factory or dealership. Authorization service 105 also responds to requests for token introspection, taking token attributes and restrictions in caveats and combining them into a single response. The system can also include edge computing service 525 between authorization service 105 and a collection of Internet of Things (IoT) devices: IoT device one 562, IoT device two 564 to IoT device 'n' 566, with the IoT devices respectively including resource server one 572, resource server two 574, to resource server 'n' 576. Authorization service 105 can generate and forward a broadly-scoped access token to edge computing service 525.

In one use case, for Internet of Things (IoT) devices in remote regions, authentication service 105 can be configured with a secret key for the IoT device. In one example the secret key can be derived using Elliptic-curve Diffie-Hellman (ECDH), a key agreement protocol that allows two parties, each having an elliptic-curve public—private key pair, to establish a shared secret over an insecure channel. This shared secret may be directly used as a key, or to derive another key. The key, or another derived key, can then be used to encrypt subsequent communications using a symmetric-key cipher.

For one IoT use case, a field technician can perform authentication via an OAuth flow with the authentication service 105 in the cloud, before setting off to the remote location of the IoT device, to obtain a Macaroon access token that the IoT device can verify locally. The disclosed authentication service 105 can attach caveats to the access token for the IoT device, utilizing scripts/rules that specify policy, for appending locally-checkable conditions. For example, a time could be added, using a caveat, to specify that the access token for the IoT device enables the technician to access the device between 10 am and 3 pm on a particular day.

Another use case for providing service access to one or more IoT devices is connected enabled smart cars. For this use case, IoT limited use can apply to a car handed over to a valet service. The original AS is the manufacturer, which delegates to dealers via one or more caveats on an existing key for a particular car. The dealer delegates to the driver/owner, which is the first client. The first client delegates with strict caveats to a second client possessed by the valet service. The valet service would then have access to the car with a top speed limitation and a maximum range for a limited time. The enabled smart car can include local resources for verifying authenticity of a MATwC, including a unique key and a local proximity interface for receiving the MATwC. For IoT enabled smart cars and valet parking, one could rent a connected enabled smart car via a mobile app and be issued a macaroon access token that allows the unlocking of the car using the mobile app instead of using a physical key. Further, the car driver could go to a venue with valet parking which is out of range of cell/Wi-Fi signals and could use the mobile app to create a copy of the macaroon access token with caveats applied to limit the expiry time, such as permitting the valet to only drive the car for the next two hours and perhaps limiting the top speed. The driver's mobile app could then transmit the macaroon with appended caveats (MATwC) to the valet's mobile phone, over a local BLUETOOTH' connection, in one example. The valet could use the MATwC to access the car, which could validate the MAT and caveats locally.

In one disclosed method of providing service access to a first device to be serviced, the first device includes local resources for verifying authenticity of a Macaroon access token with caveats (MATwC), the local resources including a unique key stored in memory of the first device and a local proximity interface for receiving the MATwC. The method includes delegating authorization for a technician to service the first device, including generating a Macaroon access token (abbreviated MAT) using the unique key of the first device, modifying the MAT by appending one or more caveats that narrow authorization provided by the MAT with at least an expiration date/time, and applying a message authentication code (MAC) chaining algorithm to generate an updated signature and to sign a resulting MAT with caveats (MATwC). The method also includes forwarding, to a second device used by the service technician, the MATwC, whereby the technician can prove possession of authority to service the first device in a local service mode by using a local proximity interface of the second device to present the MATwC to the local proximity interface to the first device for local authentication by the first device. In many use cases, the Macaroon access token is compatible with OAuth 2.0 or OAuth 2.1 drafts as of November 2020. In some cases, the second device connects to the local proximity interface of the first device and presents the MATwC to the first device for local authentication. The first device performs local authentication of the MATwC, evaluating the appended caveats, and enters a service mode consistent with the appended caveats, without requiring connected resources to evaluate the MATwC. Some use cases also include using a serial number or other unique identifier of the first device to look up the unique key, and in some cases using a serial number or other unique identifier of the first device to derive the unique key. In some examples, the device to be serviced is in a user's home and the technician travels to the device to be serviced. In other examples, the device to be serviced is received at a service facility and the technician provides service at the service facility. For some implementations, the disclosed method includes appending in the caveats a limited service authorization, whereby the authority to enter the service mode is restricted to limited service availability. In other examples when the first device is a vehicle, the method also includes appending in the caveats a limited travel area authorization, whereby the authority to drive the vehicle while in the service mode is restricted to limited travel area.

A disclosed IoT sensor deployment use case utilizes IoT reporting caveats than can be applied to remote sensors, such as agricultural sensors positioned in fields. The original AS may be the manufacturer, which delegates to dealers or authorized service agencies. Optionally, delegation can go to the farmer. Caveats are appended to indicate reporting authority of the sensor, such as a position in a field, either as general as the 'back forty' or as specific as GPS accuracy permits. When the IoT sensor reports data, it is accompanied by a token that indicates its authorized position, which may or may not match its reported position, in scenarios in which the IoT sensing device has location sensing capability. Edge servers collect data from the sensors and pass the data onto a resource server that handles data from the fields. The resource server could have its own AS with keys for all of the sensors in its domain or it could access the factory's access server to authenticate tokens.

FIG. 6 shows an example user interface for applying Macaroons and caveats to OAuth2 for confirming delegation authorization from an authorization server by a client to a service. The UI shows an example set of eleven requests 622, relative to access tokens, and includes caveats for restricting macaroons. The syntax and semantics of the caveats in the Macaroon access token (MAT) and Macaroon access token with caveats (MATwC) are usable for indicating a progression of signatures applied in MAC chaining, such that the AS can authenticate a final signature on the MATwC.

We describe representative workflows for disclosed methods next.

Workflows

FIG. 7 shows a representative workflow for confirming delegation of authorization from an authorization server (AS) by a client to a service. Flowchart 700 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 7 begins with action 710 with an authorization server (AS) issuing an OAuth2 access token in the form of a Macaroon (MAT), optionally with caveats in the MAT, including a root signature, and directly or indirectly providing the MAT to a client.

Process 700 continues at action 720 with the client modifying the access token by appending caveats to the MAT that narrow authorization provided by the MAT, and by applying a message authentication code (MAC) chaining algorithm to generate an updated signature to include in the resulting MAT with caveats (MATwC).

Action 730 includes the client delegating authorization to a service by forwarding the MATwC to the service.

Action 740 includes the service using the MATwC to access a resource server (RS).

Process 700 further continues at action 750 with the RS passing the MATwC to the AS.

At action 760, the process includes the AS determining authenticity of the MATwC as a bearer token and evaluating scope of authorization from the MAT as narrowed by the appended caveats.

Process 700 further includes at action 770 the AS reporting results of the determining authenticity and evaluating scope of authorization.

FIG. 8 shows a representative workflow for secure verification by a third-party authority using bearer tokens. Flowchart 800 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 8. Multiple actions can be combined in some implementations.

FIG. 8 begins with action 810 with a client receiving, directly or indirectly, from an authorization server (AS) an access token in the form of a Macaroon (MAT), with a third party caveat that requires the client to interact with a third-party authority and obtain a discharge Macaroon authorization (DMAT) from the third-party authority.

Process 800 continues at action 820 with the client modifying the access token by appending caveats to the MAT, that narrow authorization provided by the MAT, and applying Message Authentication Code (abbreviated MAC) chaining to sign a resulting MAT with caveats (abbreviated MATwC).

Action 830 includes the client obtaining from the third-party authority a DMAT that the AS can authenticate.

Action 840 includes the client proving possession of a valid MATwC and authorization from the third-party authority by passing on the MATwC and the DMAT for the AS to determine authenticity and scope of authorization as narrowed by the appended caveats.

FIG. 9 shows a representative workflow for providing limited usage of an IoT device without requiring connected resources for authentication. Flowchart 900 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations.

FIG. 9 begins with action 910 in which the first device includes local resources for verifying authenticity of a Macaroon access token with caveats (MATwC), including a unique key stored in memory of the first device and a local proximity interface for receiving the MATwC.

Process 900 continues at action 920 with a second device used by the service technician receiving the MATwC.

Action 930 includes the second device establishing a connection with the first device over the local proximity interface and sending a request to enter the limited usage mode, the request including the MATwC.

Action 940 includes the MATwC originated with an authorization server (AS) as a Macaroon access token (MAT) using the unique key of the first device.

Process 900 further continues at action 950 in which the MAT was modified by appending one or more caveats that narrowed authorization provided by the MAT with the limited usage mode, and applied a message authentication code (MAC) chaining algorithm to sign a resulting the MATwC.

At action 960, the process includes the first device performing local authentication of the MATwC, evaluating the appended caveats and entering the limited usage mode as requested and consistent with the appended caveats, without requiring connected resources to authenticate the MATwC.

FIG. 11 shows a representative workflow for confirming proper deployment of sensors without requiring connected resources for authentication. Flowchart 1100 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations.

FIG. 11 begins with action 1110 in which authorization server (AS) issues to a first client an access token in the form of a Macaroon (MAT), optionally with caveats in the MAT, including a root signature, and directly or indirectly provides the MAT to a client.

Process 1100 continues at action 1120 with the first client modifying the access token to produce multiple instances by appending caveats to the MAT that add a deployment location to each of the multiple instances, and by applying a message authentication code (MAC) chaining algorithm to generate updated signatures to include in the multiple instances of a MAT with caveats (MATwC).

Action 1130 includes the first client forwarding the multiple instances of the MATwC to respective sensor instances.

Action 1140 includes a second client receiving, from the sensor instances, sensed data and location indicative data, accompanied by respective MATwC instances.

Process 1100 further continues at action 1150 in which the second client verifies that the location indicative data is consistent with the deployment location caveat in the respective MATwC and utilizes instances of the sensed data that are verified as consistent.

At action 1160, the process optionally includes the second client passing each of the respective MATwC instances to the AS, the AS determining authenticity of each MATwC as a bearer token, and the AS reporting results of the determining authenticity to the second client.

Other implementations may perform the actions in different orders and/or with different, fewer or additional actions than those illustrated in FIG. 7, FIG. 8, FIG. 9 and FIG. 11. Multiple actions can be combined in some implementations. For convenience, these flowcharts are described with reference to the systems that carry out the methods. The systems are not necessarily part of the methods.

Computer System

Figure 10:
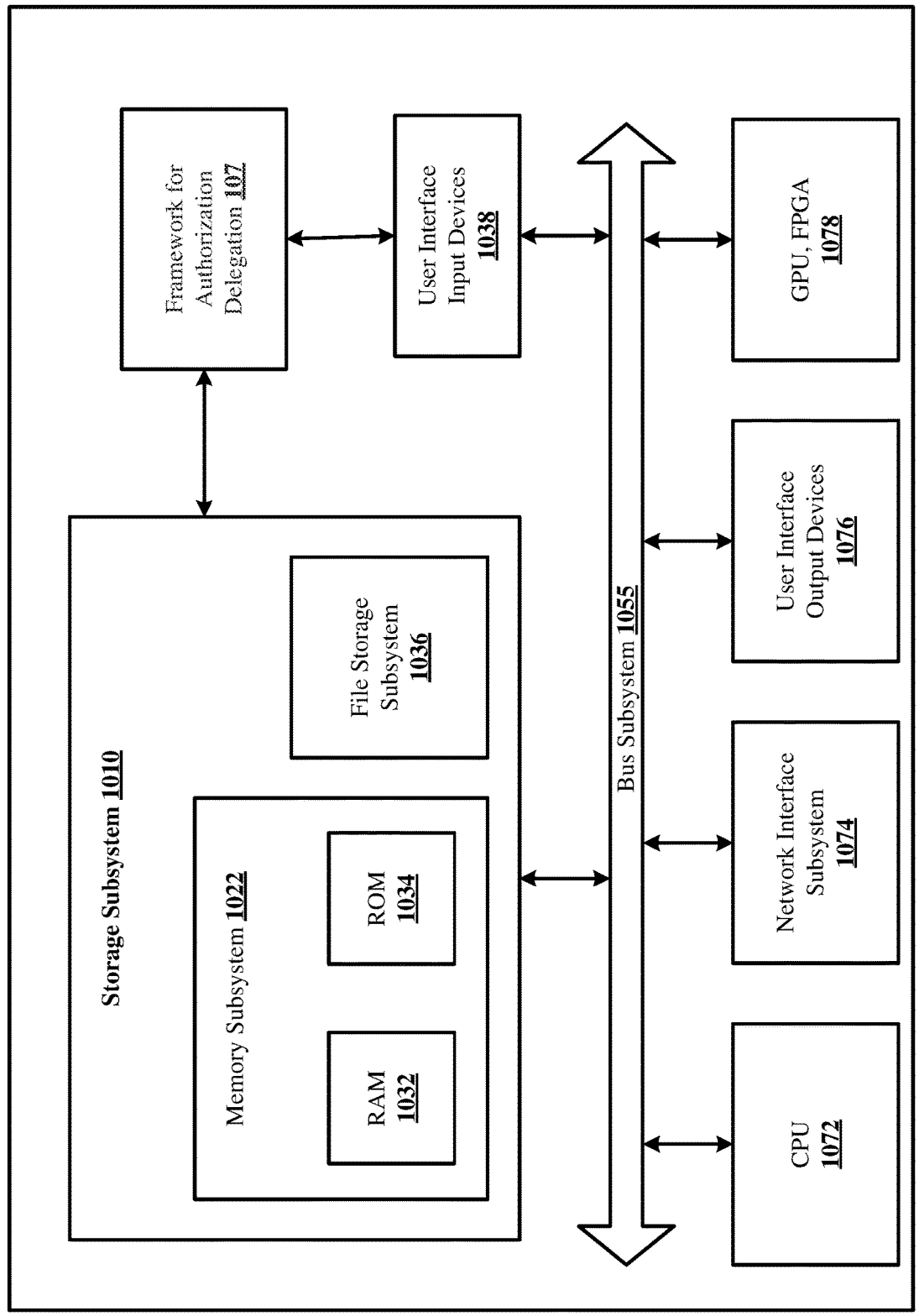
FIG. 10 is a simplified block diagram of a computer system that can be used for confirming delegation of authorization from an authorization server (AS) by a client to a service, for secure verification by a third-party authority using bearer tokens, and for providing limited usage of an IoT device without requiring connected resources for authentication, according to three embodiments of the disclosed technology.

FIG. 10 is a simplified block diagram of a computer system 1000 that can be used for confirming delegation of authorization from an authorization server (AS) by a client to a service, for secure verification by a third-party authority using bearer tokens, and for providing limited usage of an IoT device without requiring connected resources for authentication. Computer system 1000 includes at least one central processing unit (CPU) 1072 that communicates with a number of peripheral devices via bus subsystem 1055, and framework for authorization delegation 107 for delegation of authority using bearer tokens, as described herein. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems. Framework for authorization delegation 107 of FIG. 1B is communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an Light Emitting Diode (LED) display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1078 can be graphics processing units (GPUs) or field-programmable gate arrays (FPGAs).

Memory subsystem 1022 used in the storage subsystem 1010 can include a number of memories including a main random-access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or fewer components than the computer system depicted in FIG. 10.

Particular Implementations

We describe some implementations and features for confirming delegation authorization from an authorization server (AS) by a client to a service in the following discussion.

One implementation discloses a method of confirming delegation authorization from an AS by a client to a service, that includes an AS issuing an OA2 access token in the form of a Macaroon (MAT), optionally with caveats in the MAT, including a root signature, and directly or indirectly providing the MAT to a client. The method also includes the client modifying the OA2 access token by appending caveats to the MAT that narrow authorization provided by the MAT, and by applying a message authentication code (MAC) chaining algorithm to generate an updated signature to include in the resulting MAT with caveats (MATwC), and the client delegating authorization to a service by forwarding the MATwC to the service. The method further includes the service using the MATwC to access a resource server (RS), the RS passing the MATwC to the AS, the AS determining authenticity of the MATwC as a bearer token and evaluating scope of authorization from the MAT as narrowed by the appended caveat and the AS reporting results of the determining authenticity and evaluating scope of authorization.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

Many implementations of the method also include the access token in the form of a Macaroon being compatible with OAuth 2.0 or OAuth 2.1 standards as of November 2020, both of which are explained inD. Hardt et al., The OAuth 2.1 Authorization Framework draft-ietf-oauth-v2-1-00, sections 1.0 (end) and 12. It is anticipated that the macaroon access token technology disclosed will continue to apply to future bearer token draft standards whether or not those future drafts are compatible with OAuth 2.1.

Implementations of the method also include the client applying a hash-based message authentication code (HMAC) chaining algorithm to generate the updated signature, including using the root signature as a key for the HMAC and excluding the root signature from content of the MATwC. For some implementations, the client participates in a Transport Layer Security (TLS) session and the AS uses a client certificate from the TLS session to generate the root signature.

In many implementations of the disclosed method, the MAT includes caveats, the AS generating a pre-issuance signature for part of the MAT not including the caveats, then the AS using the pre-issuance signature as a key in the HMAC chaining algorithm when generating the root signature to the MAT including the caveats. In other cases, the MAT includes caveats, the AS using a key, identified by a key identifier in the MAT, in the MAC chaining algorithm when generating the root signature to the MAT including the caveats.

For some implementations, the MAT includes at least one of scope of authorization, date/time of expiration, a confirmation key that requires the client to prove possession of the associated key whenever they use the token, and an audience that restricted the audience of the MAT. Some implementations of the disclosed method also include syntax and semantics of the caveats in the MAT and MATwC indicating a progression of signatures applied in MAC chaining, such that the AS can authenticate a final signature on the MATwCs and some implementations further include the AS applying OAuth2 introspection to evaluating the scope of authorization of the MATwC. Token introspection is explained in RFC7662, which is referenced, inter alia, in RFC 6759 and the ITEF's OAuth 2.1 Authorization Framework drafts.

Some implementations of the method of confirming delegation authorization from an AS by a client to a service can be extended to services delegating authorization to subservices.

Another implementation discloses a method of confirming delegation authorization from an authorization server (AS) by a recipient to a service, including the AS issuing for use by a recipient an access token in the form of a Macaroon (MAT), optionally with caveats in the MAT, including a root signature, and directly or indirectly providing the MAT to the recipient. The method also includes the AS receiving a MAT-with-appended caveats (MATwC), which is a modified version of the access token that has been modified by appending caveats to the MAT that narrow authorization provided by the MAT, and by applying a message authentication code (MAC) chaining algorithm to generate an updated signature to include in the MATwC. The disclosed method further includes the AS determining authenticity of the MATwC as a bearer token and evaluating scope of authorization from the MAT as narrowed by the appended caveats, and the AS reporting results of the determining authenticity and evaluating scope of authorization.

Implementations of the disclosed method further include the access token in the form of a Macaroon being compatible with OAuth 2.0 or OAuth 2.1 drafts as of November 2020. Some implementations of the disclosed method further include the recipient applying a hash-based message authentication code (HMAC) chaining algorithm to generate the updated signature, including using the root signature as a key for the HMAC and excluding the root signature from content of the MATwC. The AS can confirm the signature in the MATwC because it knows a signature applied to the MAT and intermediate signatures, if any, generated during HMAC chaining to produce the signature in the MATwC to be authenticated. In some cases, the recipient participates in a Transport Layer Security (TLS) session and the AS uses a client certificate from the TLS session to generate the root signature. For some implementations of the disclosed method, the MAT includes caveats, with the AS generating a pre-issuance signature for part of the MAT not including the caveats, then the AS using the pre-issuance signature as a key in the MAC chaining algorithm when generating the root signature to the MAT including the caveats. For one implementation of the disclosed method, the MAT includes caveats, with AS using a key, identified by a key identifier in the MAT, in the MAC chaining algorithm when generating the root signature to the MAT including the caveats. For implementations of the disclosed method, the MAT further includes caveats for scope of authorization and expiration, and can further include caveats for one or more of confirmation key that requires the client to prove possession of the associated key whenever they use the token and audience that restricts the audience of the MAT. Some implementations also include the AS applying OAuth2 introspection to evaluating the scope of authorization of the MATwC. Some implementations of the disclosed method also include the recipient interacting with first through tenth services, including the recipient modifying the MAT by appending respective caveats for the first through tenth services to form first through tenth MATwCs, and the recipient forwarding the respective MATwCs for the first through tenth services to use. Some implementations of the disclosed method also include syntax and semantics of the caveats in the MAT and MATwC indicating a progression of signatures applied in MAC chaining, such that the AS can authenticate a final signature on the MATwC.

Yet another implementation discloses a method of delegating from a client to a service, authorization from an authorization server (AS), including the client receiving, directly or indirectly, from the authorization server (AS) an OAuth2 (OA2) access token in the form of a Macaroon (MAT), optionally with caveats in the MAT, including a root signature. The method includes the client modifying the OA2 access token by appending caveats to the MAT that narrow authorization provided by the MAT, and applying message authentication code (MAC) chaining to generate an updated signature to include in a resulting MAT with caveats (MATwC), and the client delegating authorization to a service by forwarding the MATwC to the service, and whereby the service can prove possession of a valid MATwC and authorization by forwarding the MATwC for the AS to determine authenticity of the MATwC as a bearer token and a scope of authorization from the MAT as narrowed by the appended caveats.

For some implementations of the disclosed method, the client participates in a Transport Layer Security (TLS) session and the root signature is generated, in part, using a client certificate from the TLS session. For some implementations, the client participates in a TLS session and the updated signature is generated, in part, using a client certificate from the TLS session. Some implementations further include using a persistent client certificate from the TLS session. For many implementations of the disclosed method, the MAT further includes at least one of a caveat for scope of authorization, expiration, a confirmation key that requires the client to prove possession of the associated key whenever they use the token, and an audience that restricts the audience of the MAT. The disclosed method can further include the client interacting with first through tenth services, including the client modifying the MAT by appending respective caveats for the first through tenth services to form first through tenth MATwCs, and the client forwarding the respective MATwCs for the first through tenth services to use. Some implementations of the disclosed method also include syntax and semantics of the caveats in the MAT and MATwC indicating a progression of signatures applied in MAC chaining, such that the AS can authenticate a final signature on the MATwC.

Another implementation discloses a method of secure verification by a third-party authority using bearer tokens, including a client receiving, directly or indirectly, from an authorization server (AS) an access token in the form of a Macaroon (MAT), with a third party caveat that requires the client to interact with a third-party authority and obtain a discharge Macaroon authorization (DMAT) from the third-party authority. The disclosed method also includes the client modifying the access token by appending caveats to the MAT, that narrow authorization provided by the MAT, and applying Message Authentication Code (MAC) chaining to sign a resulting MAT with caveats (abbreviated MATwC), the client obtaining from the third-party authority a DMAT that the AS can authenticate, and the client proving possession of a valid MATwC and authorization from the third-party authority by passing on the MATwC and the DMAT for the AS to determine authenticity and scope of authorization as narrowed by the appended caveats. Some implementations of the disclosed method further include the access token in the form of a Macaroon being compatible with OAuth 2.0 or OAuth 2.1 drafts as of November 2020.

For many implementations of the disclosed method for secure verification by a third party authority using bearer tokens, the client obtaining the DMAT from the third-party authority further includes the client modifying the access token by appending caveats to the MAT, directed to the third-party authority, and applying a hash-based message authentication code (HMAC) chaining algorithm to sign a resulting second MAT with caveats (MATwC2), and the client sending the MATwC2 to the third-party authority, wherein the DMAT derives from the MATwC2. In many instances, the MAT further includes caveats for scope of authorization and expiration. In some cases, the MAT further includes caveats for one or more of a confirmation key that requires the client to prove possession of the key associated with the MAT whenever they use the token and audience that restricts the audience of the MAT. In some cases, the confirmation key requires the client to prove possession of the DMAT. For some implementations, the disclosed method also includes the AS applying token introspection to evaluating the scope of authorization of the MATwC2.

Some implementations of the disclosed use of Macaroons with caveats utilize Internet of Things systems. Multiple different IoT scenarios are described next.

One implementation discloses a method of activating a service mode of a first device, in which the first device includes local resources for verifying authenticity of a Macaroon access token with caveats (MATwC), including a unique key stored in memory of the first device and a local proximity interface for receiving the MATwC. The disclosed method includes the first device accepting a connection with a second device over the local proximity interface and receiving from the second device a request to enter the service mode, the request including a Macaroon access token with caveats (MATwC). The disclosed method includes the MATwC originated with an authorization server (AS) as a Macaroon access token (MAT) using the unique key of the first device, and the MAT was modified by appending one or more caveats that narrowed authorization provided by the MAT with at least an expiration time and date, and applied a message authentication code (MAC) chaining algorithm to sign a resulting MAT with caveats (MATwC). The method also includes the first device performing local authentication of the MATwC, evaluating the appended caveats and determining that the expiration time and date have not passed, and entering the service mode as requested and consistent with the appended caveats, without requiring connected resources to authenticate the MATwC. Some implementations of the disclosed method also include the Macaroon access token being compatible with OAuth 2.0 or OAuth 2.1 drafts as of November 2020. The disclosed method further includes evaluating the appended caveats and determining that limited service is authorized and entering the service mode with limited service availability. In one implementation, the disclosed method can further include a third device, positioned before the second device and the first device, receiving the MATwC, delegating service of the first device to the service technician from among a pool of technicians, and participating in the forwarding of the MATwC to the second device.

Another implementation discloses a method of activating a service mode of a first device, wherein the first device includes local resources for verifying authenticity of a Macaroon access token with caveats (MATwC), including a unique key stored in memory of the first device and a local proximity interface for receiving the MATwC. The disclosed method includes a second device used by the service technician receiving the MATwC, with the second device establishing a connection with the first device over the local proximity interface and sending a request to enter the service mode, the request including the MATwC. The MATwC originated with an authorization server (AS) as a Macaroon access token (MAT) using the unique key of the first device, and the MAT was modified by appending one or more caveats that narrowed authorization provided by the MAT with at least an expiration time and date, and applied a message authentication code (MAC) chaining algorithm to sign a resulting the MATwC. The method further includes the first device performing local authentication of the MATwC, evaluating the appended caveats and determining that the expiration time and date have not passed, and entering the service mode as requested and consistent with the appended caveats, without requiring connected resources to authenticate the MATwC. In one use case, the first device is a vehicle, wherein the caveats provide a limited travel area, whereby the authority to enter the service mode is restricted to limited travel area.

Another implementation discloses a method of providing limited usage of a first device, wherein the first device includes local resources for verifying authenticity of a Macaroon access token with caveats (MATwC), including a unique key stored in memory of the first device and a local proximity interface for receiving the MATwC. The disclosed method includes the first device accepting a connection with a second device over the local proximity interface and receiving from the second device a request to enter a limited usage mode, the request including a Macaroon access token with caveats (MATwC), wherein the MATwC originated with an authorization server (AS) as a Macaroon access token (MAT) using the unique key of the first device, and the MAT was modified by appending one or more caveats that narrowed authorization provided by the MAT with the limited usage mode, and applied a message authentication code (MAC) chaining algorithm to sign a resulting MAT with caveats (abbreviated MATwC). The method also includes the first device performing local authentication of the MATwC, evaluating the appended caveats and entering the limited usage mode as requested and consistent with the appended caveats, without requiring connected resources to authenticate the MATwC. In one use case, the first device is a vehicle, further including evaluating the caveats as providing a limited travel distance authorization, and entering the limited usage mode restricted to the limited travel distance. Some cases in which the first device is a vehicle, further include evaluating the caveats as providing a limited maximum speed authorization, and entering the limited usage mode restricted to the limited maximum speed.

A similar, related implementation discloses a method of providing limited usage of a first device, wherein the first device includes local resources for verifying authenticity of a Macaroon access token with caveats (MATwC), including a unique key stored in memory of the first device and a local proximity interface for receiving the MATwC. The disclosed method includes a second device used by the service technician receiving the MATwC, with the second device establishing a connection with the first device over the local proximity interface and sending a request to enter the limited usage mode, the request including the MATwC. The MATwC originated with an authorization server (AS) as a Macaroon access token (MAT) using the unique key of the first device, and the MAT was modified by appending one or more caveats that narrowed authorization provided by the MAT with the limited usage mode, and applied a message authentication code (MAC) chaining algorithm to sign a resulting the MATwC. The disclosed method also includes the first device performing local authentication of the MATwC, evaluating the appended caveats and entering the limited usage mode as requested and consistent with the appended caveats, without requiring connected resources to authenticate the MATwC. Some implementations further include evaluating the appended caveats and determining that limited service is authorized and entering the service mode with limited service availability. In some implementations, the first device is a vehicle, wherein the caveats provide a limited service authorization, whereby the authority to enter the service mode is restricted to limited service availability.

In yet another implementation for an IoT scenario, a disclosed method of confirming proper deployment of sensors, includes an authorization server (AS) issuing to a first client an access token in the form of a Macaroon (MAT), optionally with caveats in the MAT, including a root signature, and directly or indirectly providing the MAT to a client. The method also includes the first client modifying the access token to produce multiple instances by appending caveats to the MAT that add a deployment location to each of the multiple instances, and by applying a message authentication code (MAC) chaining algorithm to generate updated signatures to include in the multiple instances of a MAT with caveats (MATwC). Further included in the disclosed method is the first client forwarding the multiple instances of the MATwC to respective sensor instances, a second client receiving from the sensor instances sensed data and location indicative data, accompanied by respective MATwC instances, and the second client verifying that the location indicative data is consistent with the deployment location caveat in the respective MATwC and utilizing instances of the sensed data that are verified as consistent. Some implementations further include the AS determining and reporting the deployment location from each MATwC, and in some cases can further include the AS evaluating and reporting whether the location indicative data satisfies the deployment location from each accompanying MATwC.

Some implementations of a disclosed method of confirming proper deployment of sensors using authorization server (AS), include the AS issuing for use by a first client an access token in the form of a Macaroon (MAT), optionally with one or more caveats in the MAT, including a root signature, and directly or indirectly providing the MAT to the first client. The method also includes the AS receiving multiple instances of MAT-with-appended caveats (MATwC) from multiple sensors, each of which is a modified version of the access token that has been modified by appending one or more caveats to the MAT that identify a deployment location for a respective sensor provided by the MAT, and by applying a message authentication code (MAC) chaining algorithm to generate an updated signature to include in the MATwC. The method further includes the AS determining authenticity of the MATwC as a bearer token, and the AS reporting results of the determining authenticity. In one implementation the MAT includes caveats, the AS using a key, identified by a key identifier in the MAT, in the MAC chaining algorithm when generating the root signature to the MAT including the caveats. In some implementations, the disclosed method further includes the first client interacting with at least first through tenth sensors, including the first client modifying the MAT by appending respective caveats for the first through tenth services to form first through tenth MATwCs, and the first client forwarding the respective MATwCs for the first through tenth sensors to use.

Another implementation discloses a method for a first client setting deployment locations of sensors that includes the first client receiving, directly or indirectly, from an authorization server (AS) an access token in the form of a Macaroon (MAT), optionally with caveats in the MAT, including a root signature. The method also includes the first client modifying the access token by appending caveats to multiple instances of the MAT that narrow authorization provided by the MAT, and applying message authentication code (MAC) chaining to generate an updated signature to include in the multiple instances of the multiple instances of the MAT with caveats (MATwC) and the first client delegating authorization to multiple sensors by forwarding respective instances of the MATwC to the sensors, wherein respective sensors can prove possession of a valid MATwC and authorization by forwarding the respective instances of the MATwC for the AS to determine authenticity of the MATwC as a bearer token. In some cases, the first client participates in a Transport Layer Security (abbreviated TLS) session and the root signature is generated, in part, using a first client certificate from the TLS session. In some cases, the first client participates in a TLS session and the updated signature is generated, in part, using a first client certificate from the TLS session. Some implementations further include at least the first client interacting with first through tenth sensors, the method including the first client modifying the MAT by appending respective caveats for the first through tenth sensors to form first through tenth MATwCs, and the first client forwarding the respective MATwCs for the first through tenth sensors to use. Some implementations further include a syntax and semantics of the caveats in the MAT and MATwC indicating a progression of signatures applied in MAC chaining, such that the AS can authenticate a final signature on the MATwC.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A method of confirming proper deployment of sensors, including:
    an authorization server (AS) issuing to a first client a Macaroon access token (MAT), optionally with caveats in the MAT, including a root signature, and directly or indirectly providing the MAT to a client;
    the first client modifying the MAT to produce multiple instances by appending caveats to the MAT that add a deployment location to each of the multiple instances, and by applying a message authentication code (MAC) chaining algorithm to generate updated signatures to include in the multiple instances of a MAT with caveats (MATwC);
    the first client forwarding the multiple instances of the MATwC to respective sensor instances;

a second client receiving, from the sensor instances, sensed data and location indicative data, accompanied by respective MATwC instances; and the second client verifying that the location indicative data is consistent with the deployment location caveat in the respective MATwC and utilizing instances of the sensed data that are verified as consistent.

2. The method of claim 1, further including the MAT being compatible with either of OAuth 2.0 or OAuth 2.1 drafts as of November 2020.

3. The method of claim 1, further including:

the second client passing each of the respective MATwC instances to the AS;

the AS determining authenticity of each MATwC as a bearer token; and the AS reporting results of the determining authenticity to the second client.

4. The method of claim 1, further including the AS determining and reporting the deployment location from each MATwC.

5. The method of claim 1, further including the AS evaluating and reporting whether the location indicative data satisfies the deployment location from each accompanying MATwC.

6. The method of claim 1, further including the first client applying a hash-based message authentication code (HMAC) chaining algorithm to generate the updated signature, including using the root signature as a key for the HMAC and excluding the root signature from content of a MATwC instance amongst the multiple instances of MATwC.

7. The method of claim 6, wherein the MAT includes caveats, the AS generating a pre-issuance signature for part of the MAT not including the caveats, then the AS using the pre-issuance signature as a key in the MAC chaining algorithm when generating the root signature to the MAT including the caveats.

8. The method of claim 6, wherein the root signature is excluded from the content of each MATwC instance.

9. A non-transitory computer readable storage medium impressed with computer program instructions to confirm proper deployment of sensors, the instructions, when executed on a processor, implement a method comprising:

an authorization server (AS) issuing to a first client a Macaroon access token (MAT), optionally with caveats in the MAT, including a root signature, and directly or indirectly providing the MAT to a client;

the first client modifying the MAT to produce multiple instances by appending caveats to the MAT that add a deployment location to each of the multiple instances, and by applying a message authentication code (MAC) chaining algorithm to generate updated signatures to include in the multiple instances of a MAT with caveats (MATwC);

the first client forwarding the multiple instances of the MATwC to respective sensor instances;

a second client receiving, from the sensor instances, sensed data and location indicative data, accompanied by respective MATwC instances; and the second client verifying that the location indicative data is consistent with the deployment location caveat in the respective MATwC and utilizing instances of the sensed data that are verified as consistent.

10. The non-transitory computer readable storage medium of claim 9, implementing the method further comprising:

the MAT being compatible with either of OAuth 2.0 or OAuth 2.1 drafts as of November 2020.

11. The non-transitory computer readable storage medium of claim 9, implementing the method further comprising:

the second client passing each of the respective MATwC instances to the AS;

the AS determining authenticity of each MATwC as a bearer token; and the AS reporting results of the determining authenticity to the second client.

12. The non-transitory computer readable storage medium of claim 9, implementing the method further comprising the AS determining and reporting the deployment location from each MATwC.

13. The non-transitory computer readable storage medium of claim 9, implementing the method further comprising the AS evaluating and reporting whether the location indicative data satisfies the deployment location from each accompanying MATwC.

14. The non-transitory computer readable storage medium of claim 9, implementing the method further comprising the first client applying a hash-based message authentication code (HMAC) chaining algorithm to generate the updated signature, including using the root signature as a key for the HMAC and excluding the root signature root signature from content of a MATwC instance amongst the multiple instances of MATwC.

15. The non-transitory computer readable storage medium of claim 14, wherein the MAT includes caveats, the AS generating a pre-issuance signature for part of the MAT not including the caveats, then the AS using the pre-issuance signature as a key in the MAC chaining algorithm when generating the root signature to the MAT including the caveats.

16. The non-transitory computer readable storage medium of claim 14, wherein the root signature is excluded from the content of each MATWC instance.

17. A system including one or more processors coupled to memory, the memory loaded with computer instructions to confirm proper deployment of sensors, the instructions, when executed on the processors, implement actions comprising:

an authorization server (AS) issuing to a first client a Macaroon access token (MAT), optionally with caveats in the MAT, including a root signature, and directly or indirectly providing the MAT to a client;

the first client modifying the MAT to produce multiple instances by appending caveats to the MAT that add a deployment location to each of the multiple instances, and by applying a message authentication code (MAC) chaining algorithm to generate updated signatures to include in the multiple instances of a MAT with caveats (MATwC);

the first client forwarding the multiple instances of the MATwC to respective sensor instances;

a second client receiving, from the sensor instances, sensed data and location indicative data, accompanied by respective MATwC instances; and the second client verifying that the location indicative data is consistent with the deployment location caveat in the respective MATwC and utilizing instances of the sensed data that are verified as consistent.

18. The system of claim 17, further implementing actions comprising the MAT being compatible with either of OAuth 2.0 or OAuth 2.1 drafts as of November 2020.

19. The system of claim 17, further implementing actions comprising:

the second client passing each of the respective MATwC instances to the AS;

the AS determining authenticity of each MATwC as a bearer token; and the AS reporting results of the determining authenticity to the second client.

20. The system of claim 17, further implementing actions comprising the AS determining and reporting the deployment location from each MATwC.

21. The system of claim 17, further implementing actions comprising the AS evaluating and reporting whether the location indicative data satisfies the deployment location from each accompanying MATwC.

22. The system of claim 17, further implementing actions comprising the first client applying a hash-based message authentication code (HMAC) chaining algorithm to generate the updated signature, including using the root signature as a key for the HMAC and excluding the root signature from content of a MATwC instance amongst the multiple instances of MATwC.

23. The system of claim 22, wherein the MAT includes caveats, the AS generating a pre-issuance signature for part of the MAT not including the caveats, then the AS using the pre-issuance signature as a key in the MAC chaining algorithm when generating the root signature to the MAT including the caveats.

24. The system of claim 22, wherein the root signature is excluded from the content of each MATwC instance.

\* \* \* \* \*